(12) United States Patent
Chen et al.

(10) Patent No.: US 10,011,264 B2
(45) Date of Patent: Jul. 3, 2018

(54) CONTROL SYSTEM OF HYBRID ELECTRICAL VEHICLE AND CONTROL METHOD FOR THE SAME

(71) Applicant: BYD COMPANY LIMITED, Shenzhen (CN)

(72) Inventors: Hao Chen, Shenzhen (CN); Ou Ruan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/917,881

(22) PCT Filed: Sep. 3, 2014

(86) PCT No.: PCT/CN2014/085829
§ 371 (c)(1),
(2) Date: Mar. 9, 2016

(87) PCT Pub. No.: WO2015/032323
PCT Pub. Date: Mar. 12, 2015

(65) Prior Publication Data
US 2016/0221570 A1 Aug. 4, 2016

(30) Foreign Application Priority Data

Sep. 9, 2013 (CN) .......................... 2013 1 0409911
Nov. 11, 2013 (CN) .......................... 2013 1 0557279

(51) Int. Cl.
*B60W 20/00* (2016.01)
*B60W 20/13* (2016.01)
(Continued)

(52) U.S. Cl.
CPC ............ *B60W 20/13* (2016.01); *B60W 10/06* (2013.01); *B60W 10/08* (2013.01); *B60W 10/26* (2013.01);
(Continued)

(58) Field of Classification Search
CPC combination set(s) only.
See application file for complete search history.

(56) References Cited

U.S. PATENT DOCUMENTS

| 5,927,415 A | 7/1999 | Ibaraki et al. |
| 6,059,059 A | 5/2000 | Schmidt-Brücken |

(Continued)

FOREIGN PATENT DOCUMENTS

| CN | 1447757 | 10/2003 |
| CN | 1528612 A | 9/2004 |

(Continued)

OTHER PUBLICATIONS

International Search Report and Written Opinion from International Application No. PCT/CN2014/085825 dated Nov. 13, 2014.
(Continued)

*Primary Examiner* — James M McPherson
(74) *Attorney, Agent, or Firm* — Alston & Bird LLP

(57) ABSTRACT

A control system of a hybrid electrical vehicle includes: a transmission device; an engine power subsystem and a motor power subsystem connected with the transmission device; and a control module configured to control the hybrid electrical vehicle to operate in a hybrid electrical-economical mode by controlling the engine power subsystem and the motor power subsystem, and to control the hybrid electrical vehicle to operate in a first manner if a current slope detected by the hybrid electrical vehicle is less than or equal to a minimum slope and a current electric quantity of a power battery of the motor power subsystem is less than or equal to a first electric quantity threshold, or if the current slope is less than or equal to the minimum slope and a maximum allowable discharge power of the power battery is less than or equal to a first power threshold.

10 Claims, 9 Drawing Sheets

(51) Int. Cl.
    *B60W 10/06*         (2006.01)
    *B60W 10/08*         (2006.01)
    *B60W 30/182*      (2012.01)
    *B60W 30/188*      (2012.01)
    *B60W 20/10*         (2016.01)
    *B60W 20/15*         (2016.01)
    *B60W 10/26*         (2006.01)

(52) U.S. Cl.
    CPC ............ *B60W 20/10* (2013.01); *B60W 20/15* (2016.01); *B60W 30/182* (2013.01); *B60W 30/1882* (2013.01); *B60W 2510/244* (2013.01); *B60W 2550/142* (2013.01); *B60W 2710/0666* (2013.01); *B60W 2710/0677* (2013.01); *B60W 2710/083* (2013.01); *B60W 2710/244* (2013.01); *Y02T 10/52* (2013.01); *Y02T 10/56* (2013.01); *Y02T 10/6286* (2013.01); *Y02T 10/84* (2013.01); *Y10S 903/93* (2013.01)

(56) References Cited

U.S. PATENT DOCUMENTS

| | | | |
|---|---|---|---|
| 6,137,250 | A | 10/2000 | Hirano et al. |
| 6,177,773 | B1 | 1/2001 | Nakano et al. |
| 6,554,088 | B2 | 4/2003 | Severinsky et al. |
| 7,216,729 | B2 | 5/2007 | Syed et al. |
| 8,018,190 | B2 | 9/2011 | Claeys et al. |
| 8,082,089 | B2 | 12/2011 | Morgan et al. |
| 8,657,045 | B2 | 2/2014 | Wang et al. |
| 8,834,317 | B2 | 9/2014 | Wang et al. |
| 9,145,146 | B2 | 9/2015 | Bureau et al. |
| 2001/0039230 | A1 | 11/2001 | Severinsky et al. |
| 2002/0173391 | A1 | 11/2002 | Endo et al. |
| 2004/0026141 | A1 | 2/2004 | Notsu et al. |
| 2004/0210356 | A1 | 10/2004 | Wilton et al. |
| 2005/0256631 | A1 | 11/2005 | Cawthorne |
| 2006/0021808 | A1 | 2/2006 | McGee et al. |
| 2006/0108956 | A1 | 5/2006 | Clark et al. |
| 2006/0231304 | A1 | 10/2006 | Severinsky et al. |
| 2007/0112496 | A1* | 5/2007 | Ji ..................... B60K 6/445 701/70 |
| 2007/0173372 | A1 | 7/2007 | Ueno |
| 2007/0293994 | A1 | 12/2007 | Zerbini et al. |
| 2008/0029319 | A1 | 2/2008 | Fleckner et al. |
| 2008/0091314 | A1 | 4/2008 | Hayashi et al. |
| 2008/0105477 | A1 | 5/2008 | Abe |
| 2008/0121443 | A1 | 5/2008 | Clark et al. |
| 2008/0146407 | A1 | 6/2008 | Tuckfield |
| 2008/0297073 | A1 | 12/2008 | Yatabe et al. |
| 2009/0306843 | A1 | 12/2009 | Jinno et al. |
| 2009/0321161 | A1 | 12/2009 | Tang |
| 2010/0030416 | A1 | 2/2010 | Jinno |
| 2010/0030447 | A1* | 2/2010 | Smyth ................... B60W 10/06 701/102 |
| 2010/0038159 | A1 | 2/2010 | Jinno et al. |
| 2010/0063661 | A1 | 3/2010 | Saito |
| 2010/0106355 | A1 | 4/2010 | Hattori et al. |
| 2010/0131217 | A1 | 5/2010 | Ichikawa |
| 2010/0145560 | A1 | 6/2010 | Komatsu et al. |
| 2010/0152938 | A1 | 6/2010 | Aoki et al. |
| 2010/0250041 | A1 | 9/2010 | Li |
| 2010/0300781 | A1 | 12/2010 | Leone |
| 2011/0071748 | A1 | 3/2011 | Nishigaki et al. |
| 2011/0082611 | A1 | 4/2011 | Shiba |
| 2011/0130906 | A1 | 6/2011 | Mayer |
| 2011/0130916 | A1 | 6/2011 | Mayer |
| 2011/0166733 | A1 | 7/2011 | Yu et al. |
| 2011/0172865 | A1 | 7/2011 | Liang et al. |
| 2011/0269599 | A1 | 11/2011 | Nakasako |
| 2011/0276209 | A1 | 11/2011 | Suganuma et al. |
| 2011/0288708 | A1 | 11/2011 | Katono et al. |
| 2011/0307130 | A1 | 12/2011 | Gow et al. |
| 2012/0072063 | A1 | 3/2012 | Kato et al. |
| 2012/0082536 | A1 | 4/2012 | Kawashima et al. |
| 2012/0083948 | A1 | 4/2012 | Tate, Jr. et al. |
| 2012/0323430 | A1 | 12/2012 | Nakamura et al. |
| 2013/0030634 | A1 | 1/2013 | Endo et al. |
| 2013/0060409 | A1 | 3/2013 | Matsushita et al. |
| 2013/0124026 | A1 | 5/2013 | Ueno et al. |
| 2013/0166122 | A1 | 6/2013 | Iino |
| 2013/0173107 | A1 | 7/2013 | Kokon |
| 2013/0245912 | A1 | 9/2013 | Boot |
| 2013/0249488 | A1 | 9/2013 | Ju et al. |
| 2013/0253743 | A1 | 9/2013 | Maruyama et al. |
| 2013/0304295 | A1 | 11/2013 | Tagawa et al. |
| 2014/0076085 | A1 | 3/2014 | Walters et al. |
| 2014/0077941 | A1 | 3/2014 | Yamamura et al. |
| 2014/0156132 | A1 | 6/2014 | Ichimoto |
| 2014/0163803 | A1 | 6/2014 | Kamatani et al. |
| 2014/0229043 | A1 | 8/2014 | Frank et al. |
| 2014/0244087 | A1* | 8/2014 | Jeong ..................... B60K 6/48 701/22 |
| 2014/0274522 | A1 | 9/2014 | Davis et al. |
| 2014/0288757 | A1 | 9/2014 | Hirasawa et al. |
| 2015/0002053 | A1 | 1/2015 | Endo et al. |
| 2015/0039167 | A1 | 2/2015 | Ideshio et al. |
| 2015/0126329 | A1 | 5/2015 | Johri et al. |
| 2015/0134160 | A1 | 5/2015 | Liang et al. |
| 2015/0291149 | A1 | 10/2015 | Kitabatake et al. |
| 2015/0336558 | A1 | 11/2015 | Yamazaki |
| 2015/0367843 | A1* | 12/2015 | West ..................... B60W 20/40 701/22 |
| 2016/0221570 | A1 | 8/2016 | Chen et al. |
| 2016/0221571 | A1 | 8/2016 | Chen et al. |
| 2016/0325728 | A1 | 11/2016 | Yang et al. |
| 2017/0036662 | A1 | 2/2017 | Chen et al. |

FOREIGN PATENT DOCUMENTS

| | | |
|---|---|---|
| CN | 1665697 | 9/2005 |
| CN | 1895942 | 1/2007 |
| CN | 1944139 | 4/2007 |
| CN | 101096180 | 1/2008 |
| CN | 101125548 | 2/2008 |
| CN | 101161523 A | 4/2008 |
| CN | 101186209 A | 5/2008 |
| CN | 101214797 | 7/2008 |
| CN | 101402314 A | 4/2009 |
| CN | 201214410 Y | 4/2009 |
| CN | 101445044 | 6/2009 |
| CN | 101445105 | 6/2009 |
| CN | 101587212 | 11/2009 |
| CN | 101618718 A | 1/2010 |
| CN | 101652538 A | 2/2010 |
| CN | 101674950 A | 3/2010 |
| CN | 101687507 A | 3/2010 |
| CN | 101830219 A | 9/2010 |
| CN | 101830222 A | 9/2010 |
| CN | 102009651 | 4/2011 |
| CN | 102009652 A | 4/2011 |
| CN | 102030005 A | 4/2011 |
| CN | 102126496 A | 7/2011 |
| CN | 102166963 A | 8/2011 |
| CN | 102180169 A | 9/2011 |
| CN | 102224047 A | 10/2011 |
| CN | 102267458 A | 12/2011 |
| CN | 102336148 A | 2/2012 |
| CN | 102358283 A | 2/2012 |
| CN | 102427980 A | 4/2012 |
| CN | 102490722 A | 6/2012 |
| CN | 102612448 A | 7/2012 |
| CN | 102658817 A | 9/2012 |
| CN | 102712313 A | 10/2012 |
| CN | 102745092 A | 10/2012 |
| CN | 102815295 | 12/2012 |
| CN | 102849064 A | 1/2013 |
| CN | 102849066 A | 1/2013 |
| CN | 103158695 A | 6/2013 |
| CN | 103189258 A | 7/2013 |
| CN | 103201153 A | 7/2013 |
| CN | 103249624 A | 8/2013 |
| CN | 103269926 A | 8/2013 |
| DE | 102007016515 A1 | 10/2008 |

(56) References Cited

FOREIGN PATENT DOCUMENTS

| | | |
|---|---|---|
| DE | 102009039615 | 3/2011 |
| DE | 102010060681 | 5/2012 |
| DE | 102011122307 | 6/2013 |
| EP | 0 867 323 A2 | 9/1998 |
| EP | 1 813 794 A1 | 8/2007 |
| EP | 2 063 088 A1 | 5/2009 |
| EP | 2 112 015 A1 | 10/2009 |
| EP | 2 127 981 A1 | 12/2009 |
| EP | 2 133 252 A1 | 12/2009 |
| EP | 2 168 827 A1 | 3/2010 |
| EP | 2 226 229 A1 | 9/2010 |
| EP | 2 308 732 A1 | 4/2011 |
| EP | 2 371 645 A1 | 10/2011 |
| EP | 2 371 646 A1 | 10/2011 |
| EP | 2 409 871 A2 | 1/2012 |
| EP | 2 460 704 A1 | 6/2012 |
| EP | 2 546 089 A2 | 1/2013 |
| JP | 2006-050704 A | 2/2006 |
| JP | 2006-094626 | 4/2006 |
| JP | 2006-183547 A | 7/2006 |
| JP | 2008-128192 | 6/2008 |
| JP | 2008-168700 | 7/2008 |
| JP | 2008271781 | 11/2008 |
| JP | 2009-090735 | 4/2009 |
| JP | 2009-166516 | 7/2009 |
| JP | 2009-198223 | 9/2009 |
| JP | 2010-179789 A | 8/2010 |
| JP | 2010-241260 | 10/2010 |
| JP | 2010-242575 A | 10/2010 |
| JP | 2011-189814 A | 9/2011 |
| JP | 2011-213166 | 10/2011 |
| JP | 2012-086701 A | 5/2012 |
| JP | 2012-091563 | 5/2012 |
| JP | 2013-086704 | 5/2013 |
| KR | 100887797 B1 | 3/2009 |
| WO | WO 2008/108498 A1 | 9/2008 |
| WO | WO 2009/008546 A1 | 1/2009 |
| WO | WO-2010/143077 A2 | 12/2010 |
| WO | WO 2012/059999 A1 | 5/2012 |
| WO | WO-2012/123486 | 9/2012 |
| WO | WO-2012/153395 | 11/2012 |
| WO | WO-2013/084333 | 6/2013 |
| WO | WO-2013/110706 A1 | 8/2013 |
| WO | WO 2013/072992 A1 | 4/2015 |

OTHER PUBLICATIONS

International Search Report and Written Opinion from International Application No. PCT/CN2014/085826 dated Nov. 15, 2014.
International Search Report and Written Opinion from International Application No. PCT/CN2014/085828 dated Dec. 1, 2014.
International Search Report and Written Opinion from International Application No. PCT/CN2014/085829 dated Dec. 3, 2014.
International Search Report and Written Opinion from International Application No. PCT/CN2014/085830 dated Nov. 19, 2014.
International Search Report and Written Opinion from International Application No. PCT/CN2014/086018 dated Dec. 17, 2014.
International Search Report and Written Opinion from International Application No. PCT/CN2014/086023 dated Dec. 12, 2014.
International Search Report and Written Opinion from International Application No. PCT/CN2014/086025 dated Dec. 10, 2014.
International Search Report and Written Opinion from International Application No. PCT/CN2014/086031 dated Dec. 3, 2014.
Office Action from Chinese Patent Application No. 201310405003.9 dated Dec. 11, 2013.
Office Action from Chinese Patent Application No. 201310444535.3 dated Dec. 11, 2013.
Office Action for U.S. Appl. No. 14/917,878 dated Dec. 7, 2016.
Notice of Allowance for U.S. Appl. No. 14/917,884 dated Oct. 12, 2017, 24 pages.
Office Action for U.S. Appl. No. 14/917,907 dated Oct. 20, 2017, 19 pages.
"Cruise Control—Wikipedia, the free encyclopedia." [retrieved May 8, 2017]. Retrieved via the Internet Archive Wayback Machine at <URL: https://web.archive.org/web/20130828091003/https://en.wikipedia.org/wiki/Cruise_control.
EPO machine translation of DE 102010060681 (original DE document published May 24, 2012), 4 pages.
Extended European Search Report for European Patent Application No. 14841488.1 dated May 4, 2017, 9 pages.
Extended European Search Report for European Patent Application No. 14842235.5 dated Apr. 20, 2017, 8 pages.
Extended European Search Report for European Patent Application No. 14842364.3 dated Apr. 11, 2017, 11 pages.
Extended European Search Report for European Patent Application No. 14842391.6 dated Apr. 20, 2017, 9 pages.
Extended European Search Report for European Patent Application No. 14842721.4 dated Apr. 20, 2017, 8 pages.
Extended European Search Report for European Patent Application No. 14842854.3 dated May 11, 2017, 10 pages.
Extended European Search Report for European Patent Application No. 14843096.0 dated Apr. 20, 2017, 8 pages.
JPO machine translation of JP 2010-241260 (original JP document published Oct. 28, 2010), 16 pages.
Office Action for U.S. Appl. No. 14/917,884 dated Apr. 3, 2017, 35 pages.
Office Action for U.S. Appl. No. 14/917,895 dated Apr. 7, 2017, 31 pages.
Office Action for U.S. Appl. No. 14/917,895 dated Sep. 5, 2017, 13 pages.
Office Action from Chinese Patent Application No. 201310444535.3 dated Jun. 16, 2016, with English translation, 21 pages.
Search Report for Chinese Patent Application No. 201310444535.3 dated Dec. 23, 2013, 5 pages.
Corrected Notice of Allowability for U.S. Appl. No. 14/917,884 dated Jan. 2, 2018, 3 pages.
Corrected Notice of Allowability for U.S. Appl. No. 14/917,884 dated Nov. 14, 2017, 2 pages.
Office Action for U.S. Appl. No. 14/917,887 dated Nov. 16, 2017, 9 pages.
Office Action for U.S. Appl. No. 14/917,895 dated Jan. 8, 2018, 39 pages.
Office Action for U.S. Appl. No. 14/917,866 dated Jan. 9, 2018, 38 pages.

* cited by examiner

CONTROL SYSTEM OF HYBRID ELECTRICAL VEHICLE AND CONTROL METHOD FOR THE SAME

FIELD

Embodiments of the present disclosure generally relate to a vehicle technology filed, and more particularly, to a control system of a hybrid electrical vehicle and a control method for a hybrid electrical vehicle.

BACKGROUND

A hybrid electrical vehicle (HEV) refers to a vehicle equipped with two types of power sources, i.e., a thermal power source (generating power by a conventional gasoline engine or diesel engine) and an electric power source (generating power by a battery and an electric motor). With disposing the electric motor in the hybrid electrical vehicle, the power system can be adjusted flexibly according to the practical operating conditions of the hybrid electrical vehicle and the engine can keep operating in regions with the optimum comprehensive properties, thus reducing oil wear and emission.

Some of the existing hybrid electrical vehicles adopt a series-parallel hybrid power system, which is characterized by disposing a mechanical gear shifting mechanism in the internal combustion engine system and the electric motor drive system respectively. The two mechanical gear shifting mechanisms are connected via a planetary wheel structure, such that the rotating speed relationship between the internal combustion engine system and the electric motor drive system can be adjusted synthetically.

However, the driving mode of the conventional hybrid electrical vehicle is simplex and the driver cannot select the driving mode according to individual driving habits, the long term and constant driving condition. For example, considering that Asians often live in concentrated districts and have a relatively constant driving path to and from work which is typically less than 50 km, it is very appropriate to drive in a pure electric driving mode. However, the conventional hybrid electrical vehicle reduces the oil wear by adjusting the engine via the electric motor instead of eliminating the oil wear completely. Therefore, the conventional hybrid electrical vehicle generally does not have the manual electrical vehicle (EV) mode switching function. Even if the conventional electrical vehicle has the manual EV mode switching function, the pure electric driving mileage of the vehicle is short due to the limitation of the electric quantity of the battery.

Moreover, since the purpose of the conventional hybrid electrical vehicle is to reduce the oil wear, the electric motor and engine with a high power and a high torque will not be selected, and thus the power performance of the hybrid electrical vehicle is low and the driving fun is greatly reduced. For example, some hybrid electrical vehicles take more than 10 s to accelerate from 0 to 100 km/h and provide a poor high speed performance.

Furthermore, some conventional hybrid electrical vehicles adopt the series-parallel structure and the method for controlling the series-parallel structure, and the strategy in which the engine drives the vehicle solely does not exist. In other words, even if in the relatively economical working regions, the engine still charges the battery via a first electric motor MG1 and adjusts the rotating speed thereof via the first electric motor MG1 to implement the gear shift. Moreover, in the heavy load acceleration condition, due to the limitation of the battery capacity, only if a part of the power of the engine is used to drive the first electric motor MG1 to generate power can the engine provide the electric energy to the second electric motor MG2 together with the battery. The above facts reduce the driving efficiency of the engine. In addition, in the engine stop-start strategy, the predetermined demanded power and speed threshold are relatively low, and the speed switching condition is set as a point instead of an interval, thus resulting in a premature and frequent start of the engine.

In addition, some conventional hybrid electrical vehicles do not adopt the plug-in structure due to the small capacity of the battery, and the electric quantity of the battery is converted from the gasoline completely, thus increasing the cost. Moreover, the series-parallel structure is complex and it is difficult to match with the Electronic Continuously Variable Transmission (ECVT), and the cost is high.

SUMMARY

Embodiments of the present disclosure seek to solve at least one of the problems existing in the related art to at least some extent.

In the related art, a control strategy of a conventional hybrid electrical vehicle may be: when the SOC (State of Charge) of power battery is higher, the hybrid electrical vehicle is driving in the pure electrical mode in the starting condition, the start driving condition and the low speed condition, the ECU (electrical control unit) detects the information such as the SOC of the power battery and the actual power requirement and so on and adjusts the starting and the stopping of the engine; in the starting process of the engine, using the planet gear to achieve the stepless speed change, the rotation speed relationship between the engine and the electric motor is adjusted, and the hybrid electrical vehicle has two electric motors, the first electric motor MG1 controls the rotation speed, and adjusts the speed proportion between the engine and the wheel, and the second electric motor MG2 can control the torque, provide the torque and responds to the requirement of the driver and the power battery.

When the SOC of the power battery is higher, the switching between the EV mode and the HEV mode needs to consider the power requirement of the vehicle, which can easily cause the engine to start and stop frequently, reduce the life of the starter, increase the driving noise and reduce the driving comfort; the transmission mechanism is ECVT, the idle rotation speed of the engine is greater, the idle noise, the fuel consumption and the emission are high, thus adding the first electric motor MG1, adjusting the rotation speed of the engine, and increasing the cost of the electric motor, and the structure of the ECVT is complex, the process requirement is high and the matching is very difficult, and the software cost and the hardware cost of the transmission mechanism is greatly increased; when the hybrid electrical vehicle is in the acceleration condition with the large load, due to the restriction of the hybrid electrical vehicle capacity, a part power of the engine is used to drive the first electric motor MG1 to generate power and then together with the power battery provide power to drive the second electric motor MG2, which may increase the conversion times of the energy and reduce the efficiency.

An object of the present disclosure is to provide a control system of the hybrid electrical vehicle.

Another object of the present disclosure is to provide a control method for a hybrid electrical vehicle.

In order to achieve the above objects, embodiments of a first aspect of the present disclosure provide a control system for a hybrid electrical vehicle including: a transmission device connected with wheels of the hybrid electrical vehicle; an engine power subsystem connected with the transmission device; a motor power subsystem connected with the transmission device; and a control module configured to control the hybrid electrical vehicle to operate in a hybrid electrical-economical mode by controlling the engine power subsystem and the motor power subsystem and to control the hybrid electrical vehicle to operate in a first manner if a current slope detected by the hybrid electrical vehicle is less than or equal to a minimum slope, a current electric quantity of a power battery of the motor power subsystem is larger than or equal to a first electric quantity threshold and a maximum allowable discharge power of the power battery is larger than or equal to a first power threshold.

With the control system of the hybrid electrical vehicle according to embodiments of the present disclosure, the engine power subsystem and the motor power subsystem are connected in parallel, which can enable the power between the engine power subsystem and the motor power subsystem to easily match, improve the transformation efficiency and effectively improve an energy utilization factor as compared with a series connection structure adopted in a power system of the conventional hybrid electrical vehicle. Moreover, the parallel connection is simple and can avoid a complex ECVT match in a series-parallel connection, which reduces a risk of driving uncomfortably caused by the match failure, thus the economy of the hybrid electrical vehicle is greatly improved on the premise of ensuring the power performance of the hybrid electrical vehicle. Furthermore, the predetermined starting value is large, which can drop the proportion of the engine-driven participation in the urban condition, reduce the fuel consumption emissions and avoid the frequent start-stop phenomenon of the engine, thus increasing the starter life, reducing the traffic noise and improving the driving comfort.

In order to achieve the above objects, embodiments of a second aspect of the present disclosure provide a control method for a hybrid electrical vehicle, including: controlling the hybrid electrical vehicle to operate in a hybrid electrical-economical mode by controlling the engine power subsystem and the motor power subsystem when the hybrid electrical vehicle is running; detecting a current electric quantity of a power battery of the motor power subsystem, a maximum allowable discharge power of the power battery of the motor power subsystem and a current slope of the hybrid electrical vehicle; and controlling the hybrid electrical vehicle to operate in a first manner if a current slope detected by the hybrid electrical vehicle is less than or equal to a minimum slope, a current electric quantity of a power battery of the motor power subsystem is larger than or equal to a first electric quantity threshold and a maximum allowable discharge power of the power battery is larger than or equal to a first power threshold.

With the method according to embodiments of the present disclosure, by providing a plurality of running modes a driving requirement of the user in different operating conditions can be satisfied, i.e., not only pure electric consumption in a city operating condition can be satisfied, but also power performance requirement in a suburban district operating condition can be satisfied, thus the hybrid electrical vehicle can be driven according to subjective operation intentions of the user and the driving fun is improved. Moreover, the method for controlling the hybrid electrical vehicle is simple and reliable and is easy to operate by users. Furthermore, the predetermined starting value is large, which can drop the proportion of the engine-driven participation in the urban condition, reduce the fuel consumption emissions and avoid the frequent start-stop phenomenon of the engine, thus increasing the starter life, reducing the traffic noise and improving the driving comfort.

Additional aspects and advantages of embodiments of present disclosure will be given in part in the following descriptions, become apparent in part from the following descriptions or become realized from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1A:
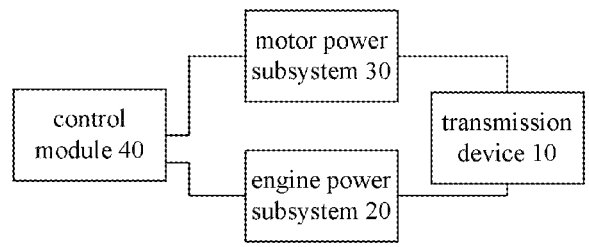
FIG. 1A is a schematic diagram of a control system for a hybrid electrical vehicle according to a first embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, and are not construed to limit the present disclosure.

The following description provides a plurality of embodiments or examples configured to achieve different structures of the present disclosure. In order to simplify the publication of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity and the repetition does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. Those having ordinary skill in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure. However, it should be appreciated that the scope of embodiments according to the present disclosure is not limited. On the contrary, embodiments of the present disclosure include all the changes, alternatives, and modifications falling into the scope of the spirit and principles of the attached claims.

In the following, a hybrid electrical vehicle and a control method for a hybrid electrical vehicle are described in detail with reference to the drawings.

FIG. 1A is a schematic diagram of a control system for a hybrid electrical vehicle according to a first embodiment of the present disclosure. As shown in FIG. 1A, the control system for the hybrid electrical vehicle includes a transmission device 10, an engine power subsystem 20, a motor power subsystem 30 and a control module 40.

The transmission device 10 is configured to drive the wheels 2a and 2b of the hybrid electrical vehicle, the engine power subsystem 20 is connected with the transmission device 10, the motor power subsystem 30 is connected with the transmission device 10. The control module 40 controls the hybrid electrical vehicle to operate in a hybrid electrical-economical mode by controlling the engine power subsystem 20 and the motor power subsystem 30, and controls the hybrid electrical vehicle to operate in a first manner if a current slope detected by the hybrid electrical vehicle is less than or equal to a minimum slope, a current electric quantity of a power battery of the motor power subsystem is greater than or equal to a first electric quantity threshold and a maximum allowable discharge power of the power battery is larger than or equal to a first power threshold.

Figure 1B:
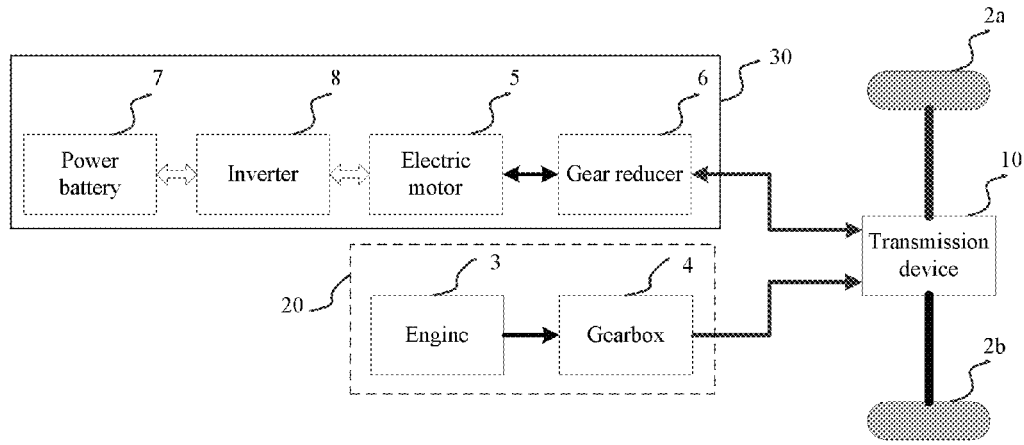
FIG. 1B is a schematic diagram of a control system for a hybrid electrical vehicle according to a second embodiment of the present disclosure.

FIG. 1B is a schematic diagram of a control system for a hybrid electrical vehicle according to a second embodiment of the present disclosure. As shown in FIG. 1B, the engine power subsystem 20 includes an engine 3 and a gearbox 4, and the motor power subsystem 30 includes an electric motor 5, a gear reducer 6, a power battery 7 and an inverter 8. The engine 3 is connected with the transmission device 10 via the gearbox 4, the electric motor 5 is connected with the transmission device 10 via the gear reducer 6 and the power battery 7 is configured to provide power to the electric motor 5.

In an embodiment of the present disclosure, the above hybrid electrical vehicle is a plug-in dual-mode hybrid electrical vehicle wherein the engine 3 is an efficient turbocharged direct injection engine capable of outputting power for driving the vehicle, the gearbox 4 is a double clutch gearbox capable of transmitting the power output from the engine 3, the power battery 7 is connected with the inverter 8 via a DC (direct current) bus, the inverter 8 is connected with the electric motor 5 via an AC three-phase wire, and then electric power and fuel power are coupled at the transmission device 10 and transmitted to the wheels 2a and 2b. The user can select the running mode of the hybrid electrical vehicle via an EV mode selecting button, a HEV mode selecting button and an operating mode selecting knob.

In an embodiment of the present disclosure, the working modes of the hybrid electrical vehicle include the HEV mode and the EV mode, in which the EV mode has two running modes such as an electrical-economical mode (EV-eco mode) and an electrical-sport mode (EV-s mode). The HEV mode has two running modes such as the hybrid electrical-economical mode (HEV-eco mode) and the hybrid electrical-sport mode (HEV-s mode). In other words, the hybrid electrical vehicle includes the electrical-economical mode (EV-eco mode), the electrical-sport mode (EV-s mode), the hybrid electrical-economical mode (HEV-eco mode) and the hybrid electrical-sport mode (HEV-s mode). The EV mode selecting button is configured to select an EV mode manually, the HEV mode selecting button is configured to select a HEV mode manually and the operating mode selecting knob is configured to switch between an economical mode and a sport mode manually.

In an embodiment of the present disclosure, one of the EV mode and HEV mode can be selected and one of the economical mode and sport mode can be selected, thus four running modes can be obtained by switching between each two modes, i.e., the EV-eco mode, the EV-s mode, the HEV-eco mode and the HEV-s mode can be obtained. In the EV mode, the hybrid electrical vehicle is in a pure electric power mode and the engine is kept out of operation. In the HEV mode, the hybrid electrical vehicle is in a hybrid power mode, and the electric motor cooperates with the engine, drives the engine or adjusts the engine so as to make the engine to operate in a working region with an optimal comprehensive property. In the economical mode, maximum outputs of the electric motor, the engine and the power battery are limited to ensure the electric motor, the engine and the power battery to operate in a most economical region. In the Sport mode, a power performance of the hybrid electrical vehicle is satisfied. Preferably maximum outputs of the electric motor, the engine and the power battery are not limited, such that total power of the power system can be obtained.

Figure 2:
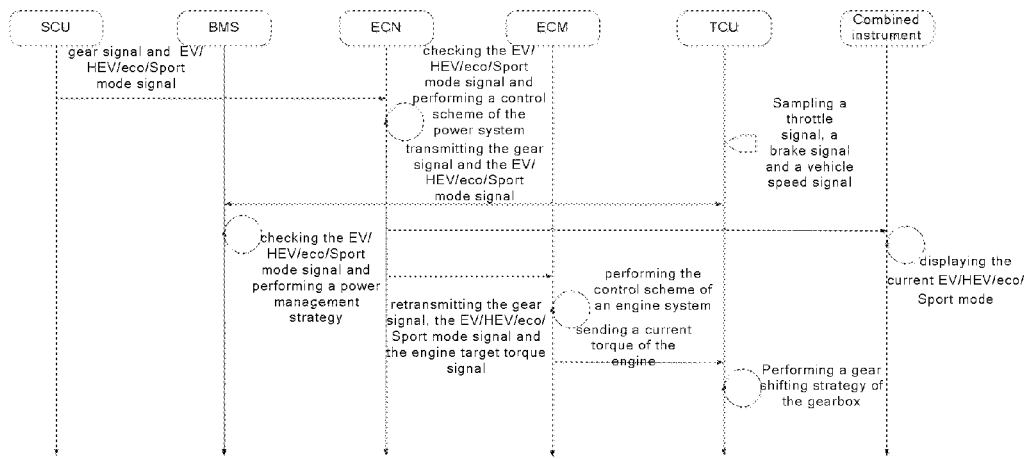
FIG. 2 is a schematic diagram showing a signal flow of a hybrid electrical vehicle according to an embodiment of the present disclosure.

FIG. 2 is a schematic diagram showing a signal flow of a hybrid electrical vehicle according to an embodiment of the present disclosure. The control module 40 includes a gear controller (SCU), an electric motor controller (ECN), a battery manager (BMS), an engine controller (ECM) and a transmission controller (TCU). As shown in FIG. 2, the gear controller (SCU) is configured to sample a gear signal and an EV/HEV/eco/Sport mode signal and to transmit the gear signal and the EV/HEV/eco/Sport mode signal to the electric motor controller (ECN). The electric motor controller (ECN) checks the EV/HEV/eco/Sport mode signal and forwards the gear signal and the EV/HEV/eco/Sport mode signal to the battery manager (BMS), the engine controller (ECM), the transmission controller (TCU) and a combination instrument. At the same time, the electric motor controller (ECN) performs a corresponding power system control scheme according to different mode strategies and sends an engine stop-start instruction and an engine target torque signal to the engine controller (ECM). The battery manager (BMS) checks the EV/HEV/eco/Sport mode signal and performs a power management strategy. The engine controller (ECM) performs an engine system control scheme and sends a current torque of the engine to the transmission controller (TCU). The transmission controller (TCU) samples a throttle signal, a brake signal and a vehicle speed signal and shifts the gear according to a gear shifting strategy of the gearbox. The combined instrument is configured to display the current EV/HEV/eco/Sport mode.

In an embodiment of the present disclosure, the control module 40 controls the hybrid electrical vehicle to switch among the electrical-economical mode, the electrical-sport mode, the hybrid electrical-economical and the hybrid electrical-sport mode according to a driving state of the hybrid electrical vehicle and/or a operating state of the power battery.

Figure 3:
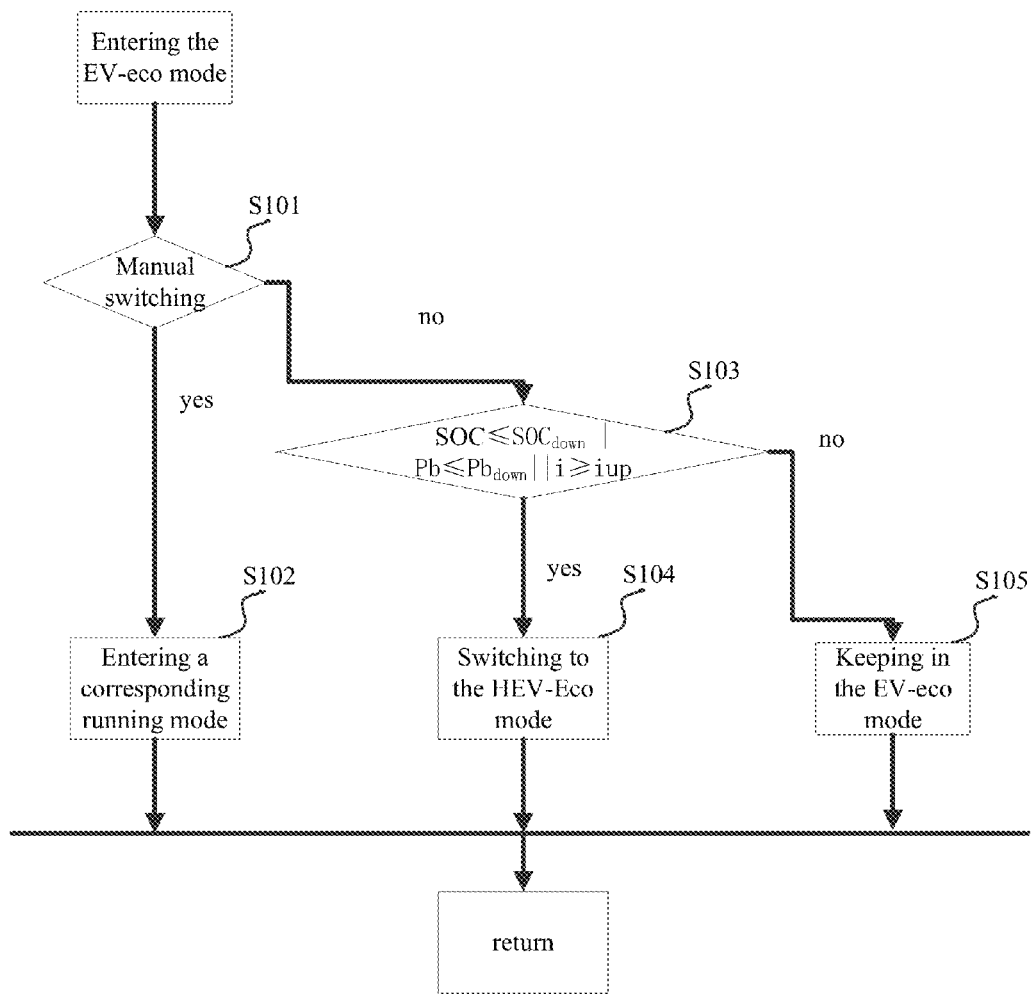
FIG. 3 is a flow chart of a control method for a hybrid electrical vehicle in an electrical-economical mode according to an embodiment of the present disclosure.

In an embodiment of the present disclosure, as shown in FIG. 3, when the hybrid electrical vehicle is in the electrical-economical mode the control module 40 controls the hybrid electrical vehicle to switch to the hybrid electrical-economical mode from the electrical-economical mode if a current electric quantity of the power battery is less than or equal to a second electric quantity threshold such as 20%, a maximum allowable discharge power of the power battery is less than or equal to a second power threshold such as 12 KW, or a slope detected by the hybrid electrical vehicle is greater than or equal to a maximum slope such as 15%.

In other words, in the embodiment as shown in FIG. 3, when the hybrid electrical vehicle is driving in the EV-eco mode and no mode switching condition is triggered the power battery provides power to the electric motor 5 to drive the hybrid electrical vehicle and the engine 3 is kept out of operation. When the HEV mode selecting button is pressed manually, the mode of the hybrid electrical vehicle is switched to the HEV-eco mode. When the operating mode selecting knob is rotated to the Sport mode the mode of the hybrid electrical vehicle is switched to the EV-s mode. When there is no manual input to the mode selecting buttons the control module 40 controls the hybrid electrical vehicle to switch to the HEV-eco mode automatically if the current electric quantity of the power battery is less than or equal to a minimum electric quantity threshold such as 20%, the maximum allowable discharge power of the power battery is less than or equal to a minimum power threshold such as 12 KW, or the slope detected by the hybrid electrical vehicle is greater than or equal to the maximum slope such as 15%. In the EV-eco mode, in order to improve an electric energy consumption efficiency so as to lengthen a driving mileage, a maximum output power of the electric motor is limited; moreover considering an accelerating ability of the hybrid electrical vehicle and a maximum output torque of the electric motor is not limited. In other words, when the hybrid electrical vehicle is in the EV-eco mode, the control module controls the hybrid electrical vehicle to drive with a limited power.

Figure 4:
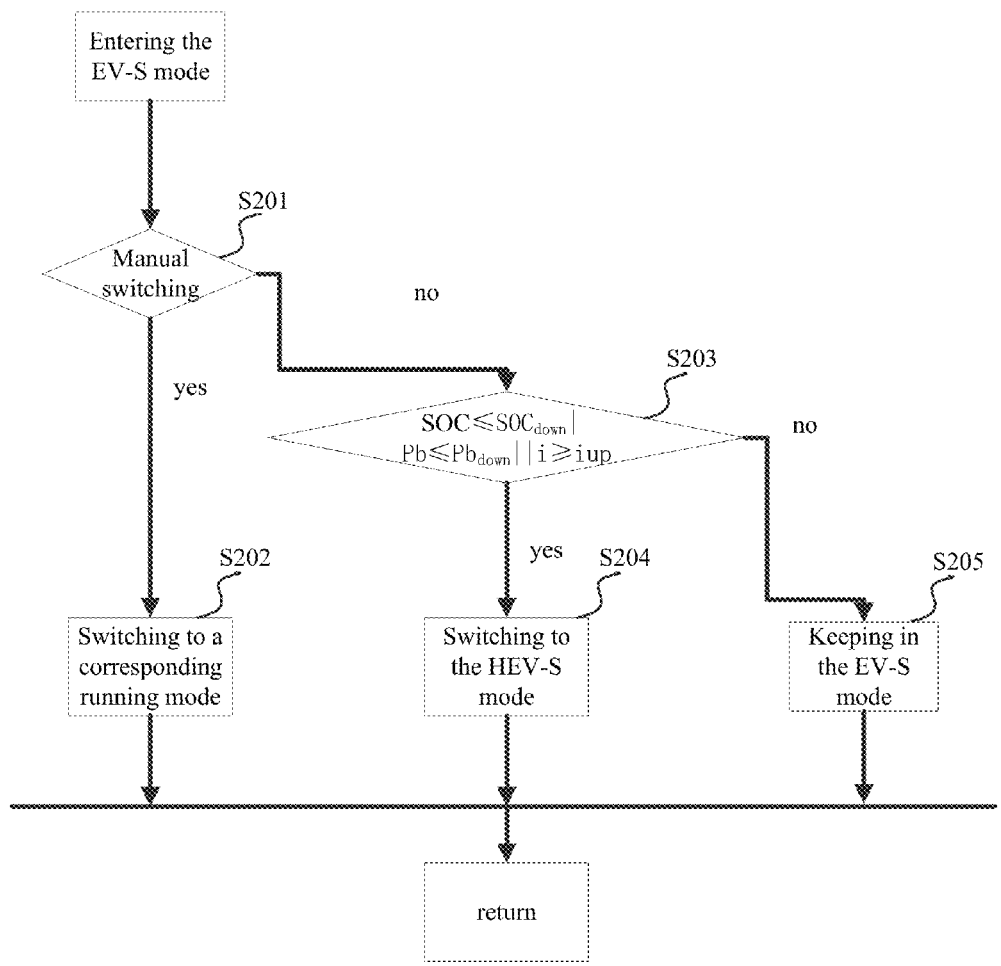
FIG. 4 is a flow chart of a control method for a hybrid electrical vehicle in an electrical-sport mode according to an embodiment of the present disclosure.

In another embodiment of the present disclosure, as shown in FIG. 4, when the hybrid electrical vehicle is in the electrical-sport mode, the control module 40 controls the hybrid electrical vehicle to switch to the hybrid electrical-sport mode from the electrical-sport mode if the current electric quantity of the power battery is less than or equal to the second electric quantity threshold such as 20%, the maximum allowable discharge power of the power battery is less than or equal to the second power threshold such as 12 KW, or the slope detected by the hybrid electrical vehicle is greater than or equal to the maximum slope such as 15%.

In other words, in the embodiment as shown in FIG. 4, when the hybrid electrical vehicle is driving in the EV-s mode and no mode switching condition is triggered, the power battery provides power to the electric motor to drive the vehicle and the engine is kept out of operation. When the HEV mode selecting button is pressed manually, the hybrid electrical vehicle is switched to the HEV-s mode. When the operating mode selecting knob is rotated to the economical mode, the hybrid electrical vehicle is switched to the EV-eco mode. When there is no manual input to the mode selecting buttons, the control module 40 controls the hybrid electrical vehicle to switch to the HEV-s mode automatically if the current electric quantity of the power battery is less than or equal to the minimum electric quantity threshold such as 20%, the maximum allowable discharge power of the power battery is less than or equal to the minimum power threshold such as 12 KW, or the slope detected by the hybrid electrical vehicle is greater than or equal to the maximum slope such as 15%. In the EV-s mode, the most important task is to obtain better power performance, and thus the output power of the electric motor is not limited.

As shown in FIGS. 3 and 4, when the hybrid electrical vehicle is in the electrical-economical mode or the electrical-sport mode, if an mode switching instruction is input from the user (i.e., the mode switching condition is triggered) the control module 40 controls the hybrid electrical vehicle to switch to the mode corresponding to the mode switching instruction.

Therefore, in an embodiment, by selecting the EV mode and the eco/Sport mode, the hybrid electrical vehicle can operate in the EV-eco mode or the EV-s mode. Due to the hybrid electrical vehicle using a plug-in battery charging structure, the capacity of the power battery is increased and a larger power and a larger torque of the electric motor 5 is selected and the hybrid electrical vehicle in the EV mode can operate in a more powerful manner, thus dealing with all city road conditions and most suburban road conditions without triggering the automatic mode switch function. Only when the slope detected by the hybrid electrical vehicle is greater than the maximum slope, e.g., 15% (an upper limit maximum in EV mode), the hybrid electrical vehicle is automatically switched to the HEV mode, unless the operator manually selects other modes, otherwise the hybrid electrical vehicle can remain in the HEV mode. In the EV-eco mode the output maximum torque of the electric motor is limited and the output power of the electric motor is not limited, thus the climb performance at the low speed and the high efficiency at the high speed can be ensured. In EV-s mode, the output maximum torque of the electric motor and the output power of the electric motor are not limited to ensure the strongest power in the EV mode. The control system of the hybrid electrical vehicle can ensure the dynamic performance and the extend driving range when the hybrid electrical vehicle is in pure electrical driving mode and at the same time meet the driving needs of the hybrid electric cars, which can avoid higher power consumption for a long time so as to improve the electrical efficiency. Furthermore, in order to ensure that the hybrid electrical vehicle can continue the normal operation when the electric quantity of the power battery is low, the maximum output power of the power battery or the slope is larger, thus avoiding the dynamic performance to decrease due to certain factors. At the same time, operation in automatic mode may avoid frequent start and stop of the engine, thus improving the life of the started engine, reducing the noise and improving the driving comfort.

Figure 5:
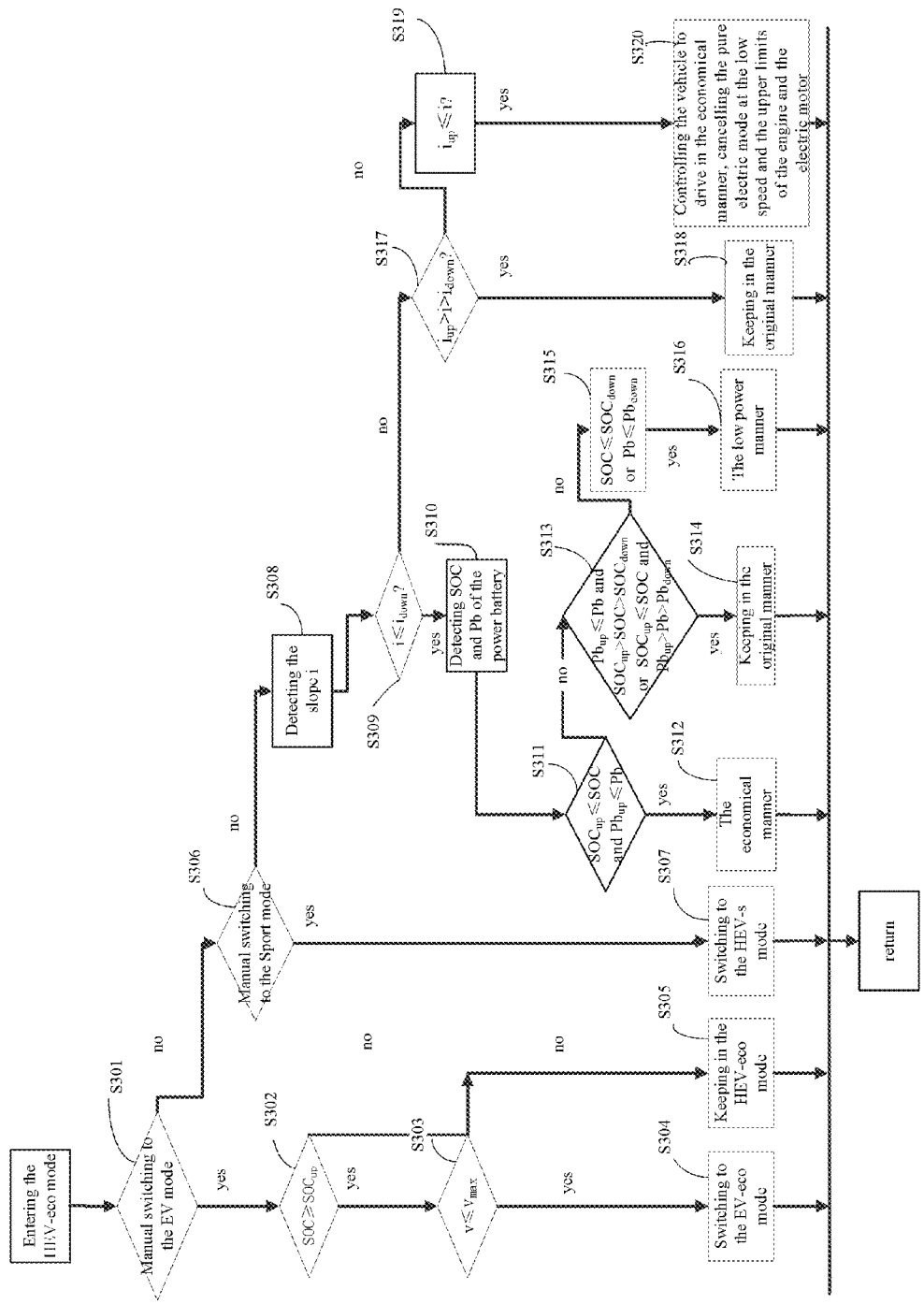
FIG. 5 is a flow chart of a control method for a hybrid electrical vehicle in a hybrid electrical-economical mode according to an embodiment of the present disclosure.

In an embodiment of the present disclosure, as shown in FIG. 5, when the hybrid electrical vehicle is in the hybrid electrical-economical mode and the control module 40 receives the mode switching instruction to switch to the electrical-economical mode the control module 40 controls the hybrid electrical vehicle to switch to the electric-economical mode if the current electric quantity of the power battery is larger than or equal to the first electric quantity threshold such as 30%, or a current speed of the hybrid electrical vehicle is less than or equal to a third speed threshold such as 150 km/h.

Further, when the hybrid electrical vehicle is in the hybrid electrical-economical mode, the control module 40 controls the hybrid electrical vehicle to operate in a first manner if the slope detected by the hybrid electrical vehicle is less than or equal to the minimum slope such as 5%, the current electric quantity of the power battery is larger than or equal to the first electric quantity threshold such as 30% and the maximum allowable discharge power of the power battery is greater than or equal to the first power threshold such as 30 kw. When the hybrid electrical vehicle is in the hybrid electrical-economical mode, the control module 40 controls the hybrid electrical vehicle to operate in a second manner if the slope detected by the hybrid electrical vehicle is less than or equal to the minimum slope such as 5% and the current electric quantity of the power battery is less than or equal to the second electric quantity threshold such as 20% or if the current slope detected by the hybrid electrical vehicle is less than or equal to the minimum slope such as 5% and the maximum allowable discharge power of the power battery is less than or equal to the second power threshold such as 12 KW, wherein the first electric quantity threshold is greater than the second electric quantity threshold, and the first power threshold is greater than the second power threshold. It should be noted that, in embodiments of the present disclosure, the first manner may be an economical manner, and the second manner may be a low power manner in which the engine 3 drives the electric motor 5 to generate power quickly so as to get out of a low power state such that the electric motor 5 again has the ability of adjusting the working region of the engine, thus ensuring the economy of the hybrid electrical vehicle.

Figure 6:
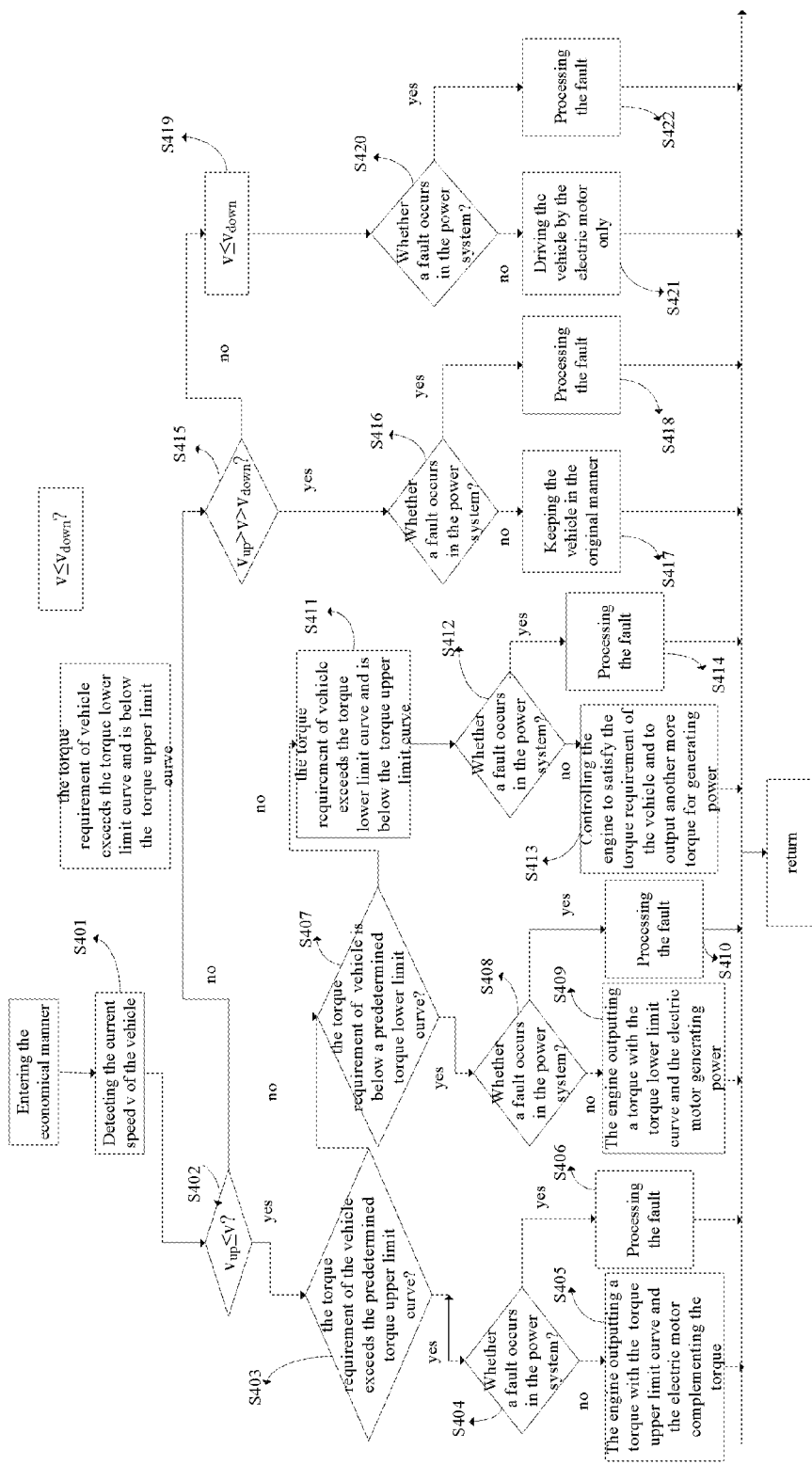
FIG. 6 is a flow chart of a control method for a hybrid electrical vehicle in an economical manner when the hybrid electrical vehicle is in a hybrid electrical-economical mode according to an embodiment of the present disclosure.
Figure 7:
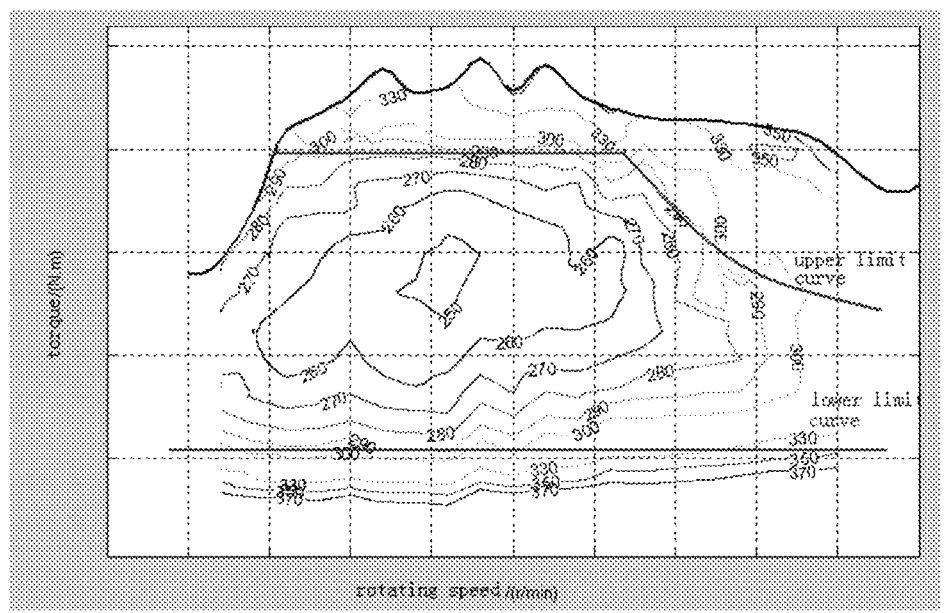
FIG. 7 is a schematic diagram showing a working region of an engine when a hybrid electrical vehicle is in a hybrid electrical-economical mode according to an embodiment of the present disclosure.
Figure 8:
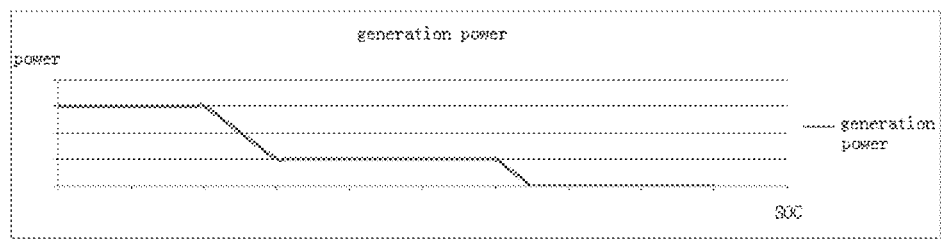
FIG. 8 is a schematic diagram showing a relationship between a generation power of an electric motor and an electric quantity of a power battery according to an embodiment of the present disclosure.

In an embodiment of the present disclosure, as shown in FIG. 6, when the hybrid electrical vehicle operates in the economical manner and the speed of the hybrid electrical vehicle is less than or equal to a first speed threshold such as 15 km/h the control module 40 controls the engine 3 of the engine power subsystem 20 to stop and to control the electric motor 5 of the motor power subsystem 30 still to operate. In other words, when the hybrid electrical vehicle operates in the hybrid electrical-economical mode, the engine 3 is controlled to stop, at this time only the electric motor 5. Further, when the hybrid electrical vehicle operates in the economical manner and the speed of the hybrid electrical vehicle is greater than or equal to a second speed threshold such as 30 km/h, the control module 40 controls the engine 3 to output a torque with a predetermined torque upper limit curve and controls the electric motor to complement the torque if a torque requirement of the hybrid electrical vehicle exceeds the predetermined torque upper limit curve of the engine (i.e., a torque required to keep the hybrid electrical vehicle driving normally in a current state). The control module 40 controls the engine to output a torque with a predetermined torque lower limit curve and controls the electric motor 5 to generate power if the torque requirement of the hybrid electrical vehicle is below the predetermined torque lower limit curve of the engine and the control module 40 controls the engine 3 to output a torque satisfying the torque requirement of the hybrid electrical vehicle and controls the electric motor 5 to generate power if the torque requirement of the hybrid electrical vehicle exceeds the predetermined torque lower limit curve of the engine and is below the predetermined torque upper limit curve of the engine. In this embodiment of the present disclosure, the predetermined torque upper limit curve and the predetermined torque lower limit curve of the engine are shown in FIG. 7. When the torque requirement of the hybrid electrical vehicle exceeds the predetermined torque lower limit curve of the engine and is below the predetermined torque upper limit curve of the engine, a relationship between a generation power of the electric motor and the state of charge (SOC) of the power battery is shown in FIG. 8.

Figure 9:
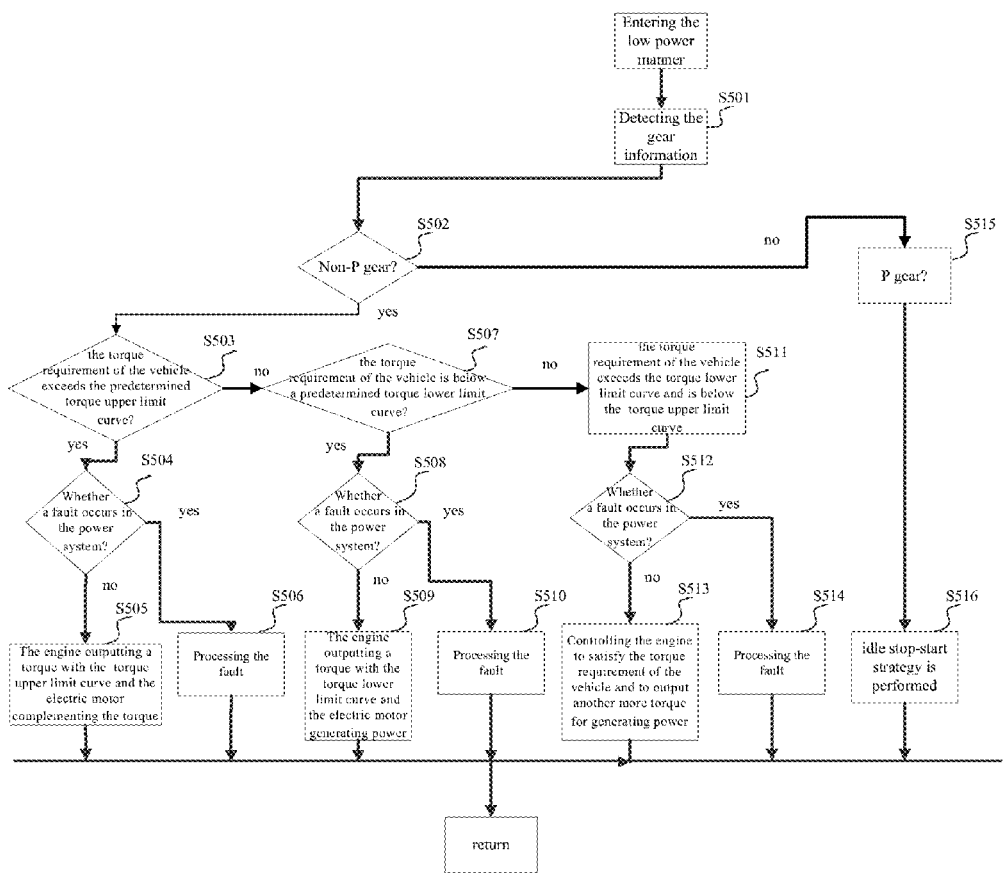
FIG. 9 is a flow chart of a control method for a hybrid electrical vehicle in a low power manner when the hybrid electrical vehicle is in a hybrid electrical-economical mode according to an embodiment of the present disclosure.

In an embodiment of the present disclosure, as shown in FIG. 9, when the hybrid electrical vehicle operates in the low power manner and is in a non-P gear, the control module 40 controls the engine to output a torque with the predetermined torque upper limit curve and controls the electric motor 5 to complement the torque if the torque requirement of the hybrid electrical vehicle exceeds the predetermined torque upper limit curve of the engine. The control module 40 controls the engine to output a torque with the predetermined torque lower limit curve and controls the electric motor 5 to generate power if the torque requirement of the hybrid electrical vehicle is below the predetermined torque lower limit curve of the engine; and the control module 40 controls the engine 3 to output a torque satisfying the torque requirement of the hybrid electrical vehicle and controls the electric motor 5 to generate power if the torque requirement of the hybrid electrical vehicle exceeds the predetermined torque lower limit curve of the engine and is below the predetermined torque upper limit curve of the engine. Moreover, when the hybrid electrical vehicle operates in the low power manner and is in a P gear, the control module 40 controls the hybrid electrical vehicle to enter an idle stop-start mode. When the hybrid electrical vehicle operates in the idle stop-start mode, the control module 40 determines whether idle stop-start conditions are satisfied and if the idle stop-start conditions are satisfied the control module 40 controls an engine of the engine power subsystem to be stalled. In an embodiment, the idle stop-start conditions includes: a current speed of the hybrid electrical vehicle is less than a first speed threshold such as 0, the hybrid electrical vehicle is in a P gear and the current electric quantity of the power battery of the motor power subsystem is greater than or equal to the first electric quantity threshold such as 20%.

In other words, in the embodiment of the present disclosure as shown in FIG. 5, when the hybrid electrical vehicle is driving in the HEV-eco mode and the EV mode selecting button is pressed manually the hybrid electrical vehicle is allowed to switch to the EV-eco mode only if the current electric quantity of the power battery is greater than or equal to the maximum electric quantity threshold such as 30% or the current speed of the hybrid electrical vehicle is less than or equal to the third speed threshold such as 150 km/h, otherwise the hybrid electrical vehicle cannot be switched to the EV-eco mode. When the hybrid electrical vehicle is driving in the HEV-eco mode and the operating mode knob is rotated to the sport mode, the hybrid electrical vehicle is switched to the HEV-s mode. When the hybrid electrical vehicle is in the HEV-eco mode and there is no manual input to the mode selecting buttons the hybrid electrical vehicle is kept in the HEV-eco mode and the engine 3 and the electric motor 5 perform power distribution in terms of the economic strategy and the low power strategy respectively according to region division of the electric quantity of the power battery and the maximum allowable discharge power of the power battery. As shown in FIG. 6, in the economical manner, if the current speed of the hybrid electrical vehicle is less than or equal to the first speed threshold such as 15 km/h the hybrid electrical vehicle is in the pure electric driving mode. If the current speed of the hybrid electrical vehicle is greater than or equal to the second speed threshold such as 30 km/h, the engine 3 takes part in driving the vehicle until the speed of the vehicle is reduced to the first speed threshold as 15 km/h and then the hybrid electrical vehicle returns to the pure electric driving mode. In the pure electric mode, if the electric motor sends an alarm indicating the driving capability is not enough, the engine is started. As shown in FIG. 9, in the low power manner, the pure electric driving mode at a low speed is cancelled and an engine stop-start function engaging the P gear is added. For the economic strategy and the low power strategy, control methods after the engine starts are the same in which the torque upper limit curve of the engine and the torque lower limit curve of the engine are predetermined, as shown in FIG. 7. Principle of designing the curves is that a region between the upper limit curve and the lower limit curve includes as many economical regions of the engine as possible. Since the engine has a poor economy outside the upper limit curve and the lower limit curve, in this region, the electric motor assists the engine to drive the vehicle. During a light load operation, under the premise of satisfying the requirement of the whole vehicle, the engine outputs the torque with the predetermined torque lower limit curve and the redundant torque is used to generate power. During a heavy load operation, the engine outputs the torque with the predetermined torque upper limit and the insufficient torque is complemented by the electric motor. If the electric motor 5 has an insufficient generation capability due to the limitation of itself or the power battery the electric motor generates power with the maximum allowable capability of itself and the power battery, and the upper limit and lower limit of the output of the engine are cancelled and the engine outputs the torque with reference to requirements of the hybrid electrical vehicle. In the region between the upper limit curve and the lower limit curve, the electric motor mainly takes part in generating power, in which the generation power of the electric motor has a certain function relation with the current SOC of the power battery, as shown in FIG. 8. However, a total output torque of the engine does not exceed the predetermined torque upper limit curve and if the electric motor 5 has an insufficient generation capability due to the limitation of itself or the power battery the electric motor generates power with the maximum allowable capability of itself and the power battery. The above HEV-eco mode driving strategy is performed when the slope detected by the vehicle is less than or equal to the maximum slope such as 15%. When the slope detected by the vehicle is greater than the maximum slope such as 15%, in order to satisfy the grade ability of the hybrid electrical vehicle, it is ruled that the engine must start at this time and the torque upper limit of the engine, the torque lower limit curve of the engine and the output power limit of the electric motor are cancelled and the original driving strategy is not performed until the slope detected by the vehicle is less than the minimum slope such as 5%.

In one embodiment, from the power structure, the control system of the hybrid electrical vehicle in embodiments of the present disclosure, one engine and one electric motor are connected in parallel via the double clutch gearbox, the traditional control system of the hybrid electrical vehicle includes one engine, a first electric motor MG1 and a second electric motor MG2 connected via the planet gear. From the start-stop of the engine, the control system of the hybrid electrical vehicle in embodiments of the present disclosure does not consider the power requirement of the whole vehicle and controls the engine to start or stop according to the vehicle speed within a certain slope and the predetermined vehicle speed is relatively large when the slope is larger when the engine is running. The traditional control system of the hybrid electrical vehicle considers the vehicle speed, the charging power requirement of the power battery, the driving power requirement of the whole vehicle and the predetermined vehicle speed in the traditional control system of the hybrid electrical vehicle is lower. From the definition for the SOC in the low power manner, the SOC of the power battery in the control system of the hybrid electrical vehicle in embodiments of the present disclosure is less than or equal to 20%, the hybrid electrical vehicle operates in the low power manner, and the SOC of the power battery in the traditional control system of the hybrid electrical vehicle is less than or equal to 45%, the hybrid electrical vehicle operates in the low power manner; from the idle start-stop strategy in the P gear, if the vehicle speed is equal to 0, the vehicle is in the P gear, the SOC is larger or equal to 20%, the engine stops and the traditional control system of the hybrid electrical vehicle further considers the temperature of the engine and the SOC is in the high level. From the running process of the whole vehicle, the control system of the hybrid electrical vehicle in embodiments of the present disclosure can switch between the economical manner and the low power manner according to the actual road condition rather than keeping the electricity balance, and in the traditional control system of the hybrid electrical vehicle, the SOC of the power battery enters a balance state after the vehicle is running for a short time. From the whole vehicle running process, because the difference of the power structure decides the control strategy between the control system in embodiments of the present disclosure and the traditional control system has some difference, and the first electrical motor in the traditional control system is adjusting the speed in the real time so as to adjust the rotation speed of the engine, and the idle rotation speed of the engine is 1200 rpm, and in the control system of the hybrid electrical vehicle in embodiments of the present disclosure, the idle rotation speed of the engine is about 800 rpm, the control system only controls six double clutch shift levers, the shift operation is relatively simple. In the control system of the hybrid electrical vehicle in embodiments of the present disclosure, the power of the engine is completely used to drive the vehicle, or the part power of the engine is used to generate power to the power battery, and when the traditional control system of the hybrid electrical vehicle is operating with the large load, the part power of the engine is used to drive the first electric motor MG1 to generate power and then together with the power battery provide power to drive the second electric motor MG2 so as to drive the vehicle.

Therefore, in the traditional control system of the hybrid electrical vehicle due to the limited performance of the power battery and the engine, the whole vehicle power of the engine when starting and stopping and the switched predetermined vehicle speed are lower, which can cause the engine to start and stop frequently and early and increases the proportion of the engine running, thus increasing the fuel consumption and the emission in the urban condition. The control system of the hybrid electrical vehicle in embodiments of the present disclosure has strong performance of pure electrical operation, meeting the vast majority of drive requirements, thus the predetermined vehicle speed are larger which can reduce the proportion of the engine running in the urban condition and reduce the fuel consumption and the emission in the urban condition. At the same time, when the driver operates the throttle it causes the power requirement to change for the whole vehicle more and frequently, thus avoiding the judgement of the whole vehicle power, reducing the start-stop frequency of the engine, extending the life of the start engine, reducing the noise and improving the comfort of the driver and at the same time, reducing the acceleration at the wide-open throttle, reducing the power pound of the engine start when climbing uphill, improving the driving safety and the driving comfort. The traditional control system of the hybrid electrical vehicle controls the engine to start or stop when the vehicle stops and is in the P gear, the SOC of the power battery and the temperature of the engine are need to be considered and the above factors are not controlled by the drivers, thus it is hard to summarize the operation rule. And due to the small capacity of the power battery, the SOC of the power battery is larger, which causes the engine to not stop when waiting for the red light and the vehicle is in the P gear, thus increasing the parking noise and reducing the comfort, and at the same time, the idle rotation speed of the engine is 1200 rpm due to the transmission mechanism, which may cause the engine noise to be louder than a fuel vehicle. Though in the control system of the hybrid electrical vehicle in embodiments of the present disclosure, the engine can stop when the vehicle is the P gear in most conditions, which can be easily summarized in the operation rule to reduce the parking noise and improve the parking comfort, and the idle rotation speed of the engine is similar to the idle rotation speed of the fuel vehicle. In addition, the control system of the hybrid electrical vehicle in embodiments of the present disclosure does not keep the electricity balanced and can switch between the economical manner and the low power manner according to the actual road condition, which can reduce the fuel consumption and the emission, and the transmission mechanism is the double clutch gearbox. The structure of the double clutch gearbox is simple, and the matching cycle is short, thus reducing the cost greatly; and the engine and the electric motor are connected in parallel when the vehicle operates in the HEV mode, the control strategy between the engine and the electric motor are easy to match and the convention efficiency is high. Finally, the generation strategy of the control system of the hybrid electrical vehicle in embodiments of the present disclosure is changed with the SOC of the power battery, thus the vehicle with the low load can keep the high electricity in the normal running.

Figure 10:
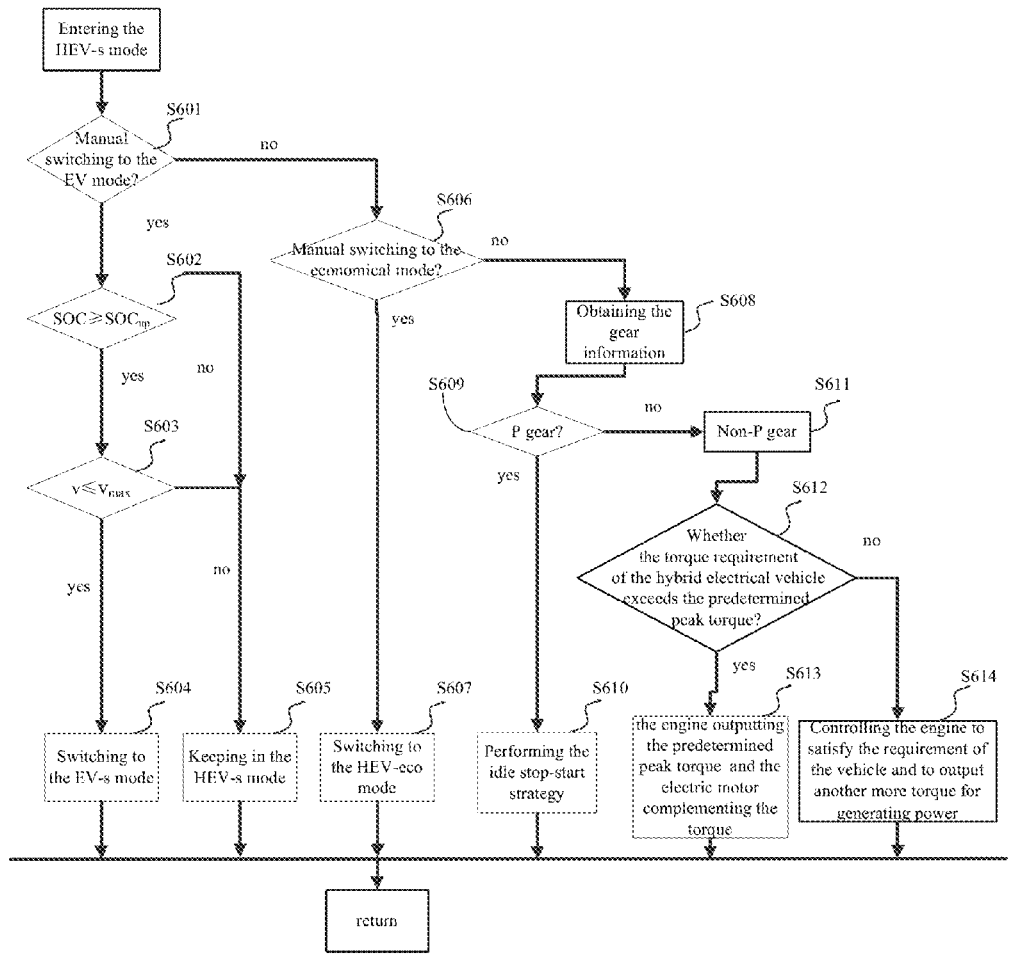
FIG. 10 is a flow chart of a control method for a hybrid electrical vehicle in a hybrid electrical-sport mode according to an embodiment of the present disclosure.

In still yet another embodiment of the present disclosure, as shown in FIG. 10, when the hybrid electrical vehicle is in the hybrid electrical-sport mode and the control module 40 receives a mode switching instruction to switch to the electrical-sport mode, the control module 40 controls the hybrid electrical vehicle to switch to the electrical-sport mode if the current electric quantity of the power battery is larger than or equal to the first electric quantity threshold such as 30% or the current speed of the hybrid electrical vehicle is less than the third speed threshold such as 150 km/h.

Moreover, when the hybrid electrical vehicle operates in the hybrid electrical-sport mode and is in the P gear, the control module 40 controls the hybrid electrical vehicle to enter the idle stop-start mode. When the hybrid electrical vehicle operates in the hybrid electrical-sport mode and is in a non-P gear, the control module 40 controls the engine to output a predetermined peak torque of the engine and controls the electric motor 5 to complement the torque if the torque requirement of the hybrid electrical vehicle exceeds the predetermined peak torque; and the control module 40 controls the engine to output a torque satisfying the torque requirement of the hybrid electrical vehicle and controls the electric motor 5 to generate power if the torque requirement of the hybrid electrical vehicle is less than or equal to the predetermined peak torque of the engine.

In other words, in the embodiment of the present disclosure as shown in FIG. 10, for the hybrid electrical vehicle driving in the HEV-s mode, when the EV mode selecting button is pressed manually, only if the current electric quantity of the power battery is greater than or equal to the maximum electric quantity threshold such as 30% or the current speed of the electrical vehicle is less than or equal to the third speed threshold such as 150 km/h can the hybrid electrical vehicle be switched to the EV-s mode, otherwise no mode switching is performed. When the operating mode knob is rotated to the economical mode, the hybrid electrical vehicle is switched to the HEV-eco mode. When there is no manual input to the mode selecting buttons, the hybrid electrical vehicle is kept in the HEV-s mode. The HEV-s mode is similar to the low power manner in the HEV-eco mode and the pure electric driving mode at a low speed is cancelled and the engine stop-start function with engaging the P gear is added. Furthermore, the output power of the electric motor is not limited and the torque upper limit and the torque lower limit of the engine are also cancelled such that the engine and the electric motor can output the peak values, thus obtaining the best power performance in the HEV-s mode.

In embodiments of the present disclosure, when the engine starts to operate, the double-clutch gearbox transmits the power from the engine and performs the gear shift. When the hybrid electrical vehicle is in the HEV-eco mode or in the HEV-s mode, two gear shift strategies are used respectively. The HEV-eco mode focuses on reducing the oil wear and a principle of the gear shift strategy thereof is to ensure the engine operates in efficient regions as far as possible, thus a shift point of each gear may be a little earlier and the engine mainly operates in a rotating speed region of 1500-2000 rpm during driving. The HEV-s mode focuses on the power performance and a principle of the gear shift strategy thereof is to ensure the torque transmitted to the wheels from the engine is as large as possible so as to obtain a better driving performance, thus the shift point of each gear may be a little later. Furthermore, with respect to the rapid acceleration with a full throttle, the shift point is defined as a maximum torque point of the engine calibrated under each gear, thus extremely improving the acceleration performance.

In an embodiment of the present disclosure, when the hybrid electrical vehicle is in the electrical-economical mode, the maximum output power of the power battery is less than a first predetermined power; when the hybrid electrical vehicle operates in the electrical-sport mode, the maximum output power of the power battery is less than a second predetermined power, in which the second predetermined power is greater than the first predetermined power; when the hybrid electrical vehicle operates in the hybrid electrical-economical mode, each of the maximum output power of the power battery and the maximum output power of the engine is less than the first predetermined power, and a maximum output torque of the engine is less than a first torque threshold; when the hybrid electrical vehicle operates in the hybrid electrical-sport mode, the maximum output power of the power battery is less than the second predetermined power, and the control module 40 allows the engine to output the maximum output torque and the maximum output power. In an embodiment of the present disclosure, the first predetermined power is 70 KW, the second predetermined power is 110 KW and the first torque threshold is 185 N·M.

In other words, in the electrical-economical mode, the hybrid electrical vehicle consumes the electric power purely and the maximum output power of the power battery is less than a maximum output power (such as 70 KW) in the economical mode and the power battery operates in the most economical regions; in the electrical-sport mode, the hybrid electrical vehicle consumes the electric power purely and the maximum output power of the power battery is less than the maximum output power (such as 110 KW) in the sport mode; in the hybrid electrical-economical mode, the hybrid electrical vehicle consumes both the electric power and the thermal power and the maximum output power of the engine is less than the maximum output power (such as 70 KW) in the economical mode and the maximum output torque of the engine is less than a maximum output torque (such as 185 N·M) in the economical mode, such that the engine and the electric motor work in the most economical regions; in the hybrid electrical-sport mode, the hybrid electrical vehicle consumes both the electric power and the thermal power and the maximum output power of the power battery is less than the maximum output power such as 110 KW in the sport mode and the control module 40 allows the engine to output the maximum output torque and the maximum output power.

It should be noted that, in embodiments of the present disclosure, the most economical region in the pure electric driving mode refers to the region in which the power battery operates with a relatively lower discharging power preferentially on the premise of satisfying the power performance (operating performance and acceleration performance) of the vehicle, this is because the working efficiency of the power battery reduces with the increment of the discharging power of the power battery. The most economical region in the hybrid mode refers to the region in which the power battery operating with a relatively lower discharging power preferentially on the premise of satisfying the power performance (operating performance and acceleration performance) of the vehicle, this is because the working efficiency of the power battery reduces with the increment of the discharging power of the power battery. The most economical region of the engine is determined by the torque and rotating speed of engine. As shown in FIG. 7, a horizontal ordinate represents the rotating speed of the engine and a longitudinal coordinate represents the torque of the engine and the most economical region of the engine can be obtained by matching an appropriate rotating speed with a certain torque. In other words, if the torque of the engine is too large the torque of the engine can be reduced and the rest torque is complemented by the electric motor; if the torque of the engine is too small, the torque of the engine can be increased, but it does not need the increased torque to drive the vehicle, thus energy generated by the increased torque is recovered to be used for power generation of the electric motor.

Further, the maximum output power in the economical mode can be understood as a maximum output power for keeping the power battery or the engine operating in the most economical regions. The maximum output power in the sport mode is a unique property, in which the engine outputs the maximum torque or the maximum power and the power battery outputs the maximum power, thus the power system provides the maximum output torque or the maximum output power for the vehicle.

In addition, it can be understood that the running mode when the hybrid electrical vehicle starts is still the running mode when the hybrid electrical vehicle is stalled at last time. Moreover, the hybrid electrical vehicle also has a pure fuel mode which is a fault mode.

With the control system of the hybrid electrical vehicle according to embodiments of the present disclosure, the engine power subsystem and the motor power subsystem are connected in parallel, which can enable the power between the engine power subsystem and the motor power subsystem to match easily, improve the transformation efficiency and effectively improve an energy utilization factor as compared with a series connection structure adopted in a power system of the conventional hybrid electrical vehicle. Moreover, the parallel connection is simple in structure and can avoid a complex ECVT match in a series-parallel connection, which reduces a risk of driving uncomfortably caused by the match failure, thus the economy of the hybrid electrical vehicle is greatly improved on the premise of ensuring the power performance of the hybrid electrical vehicle. Furthermore, the predetermined start-stop value is large, which can drop the proportion of the engine-driven participation in the urban condition, reduce the fuel consumption emissions, and avoid the frequent start-stop phenomenon of the engine, thus increasing the starter life, reducing the traffic noise, and improve the driving comfort.

In the following, a control method for the hybrid electrical vehicle is described in detail with reference to FIGS. 3-11, in which the hybrid electrical vehicle is the hybrid electrical vehicle described in above embodiments of the present disclosure. The hybrid electrical vehicle includes a transmission device, an engine power subsystem, a motor power subsystem and a control module.

Figure 11:
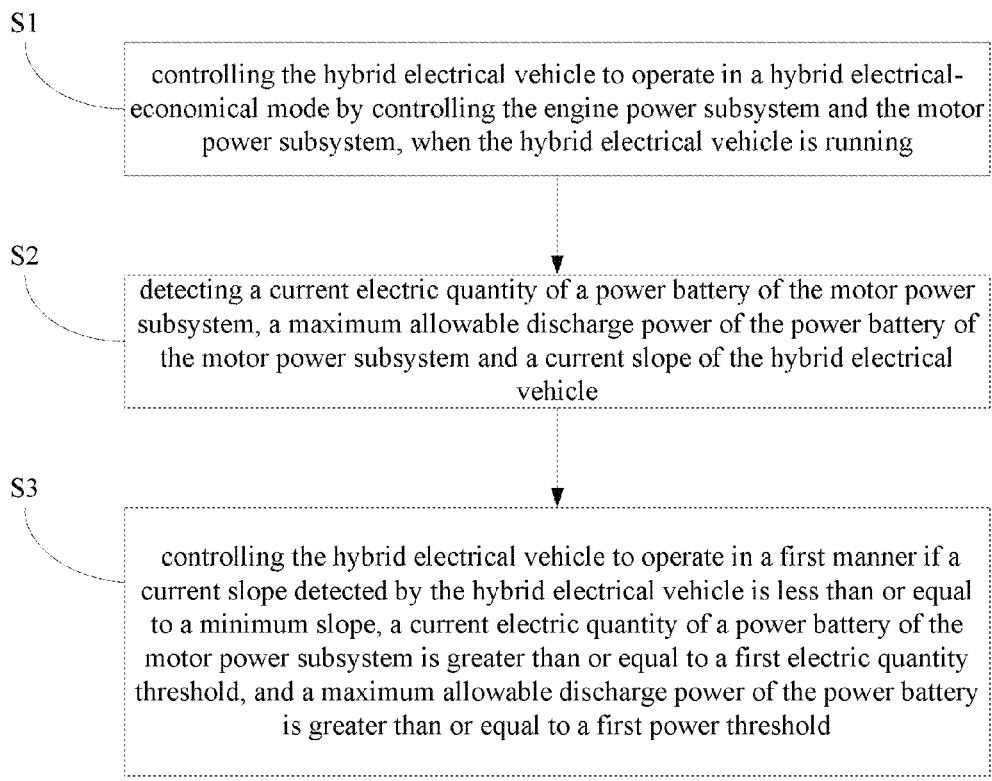
FIG. 11 is a flow chart of a control method for a hybrid electrical vehicle according to an embodiment of the present disclosure.

FIG. 11 is a flow chart of a control method for a hybrid electrical vehicle according to an embodiment of the present disclosure. As shown in FIG. 11, the method for controlling the hybrid electrical vehicle includes following steps.

At step S1, the control module controls the hybrid electrical vehicle to operate in a hybrid electrical-economical mode by controlling the engine power subsystem and the motor power subsystem when the hybrid electrical vehicle is running. The plurality of running modes include an electrical-economical mode, an electrical-sport mode, a hybrid electrical-economical mode and a hybrid electrical-sport mode.

At step S2, the control module detects a current electric quantity of a power battery of the motor power subsystem, a maximum allowable discharge power of the power battery of the motor power subsystem and a current slope of the hybrid electrical vehicle.

At step S3, the control module controls the hybrid electrical vehicle to operate in a first manner if a current slope detected by the hybrid electrical vehicle is less than or equal to a minimum slope, a current electric quantity of a power battery of the motor power subsystem is greater than or equal to a first electric quantity threshold and a maximum allowable discharge power of the power battery is greater than or equal to a first power threshold.

In embodiments of the present disclosure, the first manner may be an economical manner, and a second manner may be a low power manner.

In an embodiment of the present disclosure, as shown in FIG. 3, a control method for the hybrid electrical vehicle in an electrical-economical includes following steps.

At step S101, manual switching information is obtained, in which the manual switching information may be about whether a HEV mode selecting button switching operation is performed, whether a Sport mode selecting button switching operation is performed or whether no mode selecting button switching operation is performed. In other words, it is determined whether a manual switch is performed, if yes, execute step S102 and if no, execute step S103.

At step S102, a running mode switching is performed and a corresponding control strategy of a power system is performed. In other words, when the hybrid electrical vehicle is in the electrical-economical mode and a mode switching instruction is received from a user, the control module controls the hybrid electrical vehicle to switch to a running mode corresponding to the mode switching instruction from the user.

At step S103, the running mode is not switched, and then a current electric quantity (state of charge, SOC) of the power battery, a maximum allowable discharge power Pb of the power battery and a slope i detected by the hybrid electrical vehicle are compared with predetermined thresholds (i.e., the lower threshold of the electric quantity $SOC_{down}$ (such as 20%), the lower threshold of the maximum allowable discharge power $Pb_{down}$ (such as 12 KW), and the upper threshold of the slope $i_{up}$ (such as 15%)) respectively to determine whether $SOC \leq SOC_{down}$, whether $Pb \leq Pb_{down}$ and whether $i_{up} \leq i$.

At step S104, if at least one of the above three conditions is satisfied, the hybrid electrical vehicle is witched to the HEV-eco mode automatically. In other words, if the current electric quantity of the power battery is less than or equal to the second electric quantity threshold such as 20%, the maximum allowable discharge power of the power battery is less than or equal to the second power threshold such as 12 KW, or the slope detected by the hybrid electrical vehicle is greater than or equal to a maximum slope such as 15%, the control module controls the hybrid electrical vehicle to switch to the hybrid electrical-economical mode.

At step S105, if each of the above three conditions is not satisfied, the hybrid electrical vehicle is not switched to the HEV-eco mode and is kept driving in the EV-eco mode.

When the hybrid electrical vehicle is driven in the EV-eco mode and no manual or automatic mode switching is performed, the electric motor drives the hybrid electrical vehicle continuously as the single power source. The EV-eco mode focuses on saving electric power on the premise of satisfying a power performance requirement of the hybrid electrical vehicle and also focuses on improving the electricity efficiency by avoiding the long term and high power consumption, thus the maximum output power of the electric motor is limited to a certain value, such as 70 KW. Furthermore, in order to satisfy the grade ability of the hybrid electrical vehicle, the maximum output torque of the electric motor is not limited, i.e., when the hybrid electrical vehicle is in the EV-eco mode, the control module controls the hybrid electrical vehicle to drive with a limited power.

With the control method for the hybrid electrical vehicle in the EV-eco mode, by determining the current electric quantity of the power battery, the maximum allowable discharge power of the power battery and the slope detected by the hybrid electrical vehicle to control the vehicle to switch to the HEV-eco mode automatically, normal driving of the hybrid electrical vehicle can be ensured and risks of reducing the power performance can be avoided. In conclusion, with the method for controlling the hybrid electrical vehicle in the EV-eco mode, on the premise of satisfying the power performance of the whole vehicle, the power battery keeps operating in high efficient regions, thus realizing a long driving mileage, a low operation cost and a low emission.

In another embodiment of the present disclosure, as shown in FIG. 4, a control method for the hybrid electrical vehicle in the electrical-sport mode includes following steps.

At step S201, manual switching information is obtained, in which the manual switching information may be about whether a HEV mode selecting button switching operation is performed, whether an economical mode selecting button switching operation is performed or whether no mode selecting button switching operation is performed. In other words, it is determined whether a manual switch is performed, if yes, execute step S202 and if no, execute step S103.

At step S202, a running mode switching is performed and a corresponding control strategy of the power system is performed. In other words, when the hybrid electrical vehicle is in the electrical-sport mode and a mode switching instruction is received from the user, the control module controls the hybrid electrical vehicle to switch to a running mode corresponding to the mode switching instruction from the user.

At step S203, the running mode is not switched, and then the current electric quantity (state of charge, SOC) of the power battery, the maximum allowable discharge power Pb of the power battery and a slope i detected by the hybrid electrical vehicle are compared with predetermined thresholds (i.e., the lower threshold of the electric quantity $SOC_{down}$ (such as 20%), the lower threshold of the maximum allowable discharge power $Pb_{down}$ (such as 12 KW), and the upper threshold of the slope $i_{up}$ (such as 15%)) respectively to determine whether $SOC \leq SOC_{down}$, whether $Pb \leq Pb_{down}$ and whether $i_{up} \leq i$.

At step S204, if at least one of the above three conditions is satisfied, the hybrid electrical vehicle is switched to the HEV-s mode automatically. In other words, if the current electric quantity of the power battery is less than or equal to the second electric quantity threshold such as 20%, the maximum allowable discharge power of the power battery is less than or equal to the second power threshold such as 12 KW, or the slope detected by the hybrid electrical vehicle is greater than or equal to the maximum slope such as 15%, the control module controls the hybrid electrical vehicle to switch to the hybrid electrical-economical mode.

At step S205, if each of the above three conditions is not satisfied, the hybrid electrical vehicle is not switched to the HEV-s mode and is kept driving in the EV-s mode.

When the hybrid electrical vehicle is driven in the EV-s mode and no manual or automatic mode switching is performed, the electric motor drives the hybrid electrical vehicle continuously as the single power source. In the EV-s mode, the maximum output torque and the maximum output power of the electric motor are not limited, and thus the electric motor drives the vehicle with the maximum capacity, and a higher power performance requirement (such as overtaking acceleration and fast climbing) can be achieved in the EV mode.

With the control method for the hybrid electrical vehicle in the EV-s mode, by determining the current electric quantity of the power battery, the maximum allowable discharge power of the power battery and the slope detected by the hybrid electrical vehicle to control the vehicle to switch to the HEV-s mode automatically and normal driving of the hybrid electrical vehicle can be ensured and risks of reducing the power performance can be avoided. In conclusion, with the method for controlling the hybrid electrical vehicle in the EV-s mode, the vehicle can be driven in the pure electric driving mode and a better power performance can be achieved, and the running mode is flexible and changeable, thus providing the user with more driving fun.

In yet another embodiment of the present disclosure, as shown in FIG. 5, a control method for the hybrid electrical vehicle in the hybrid electrical-economical mode includes following steps.

At step S301, switching information about the EV mode selecting button is obtained, and it is determined whether a manual switching to the EV mode is performed, if yes, execute step S302 or step S303 and if no, execute step S306.

At step S302, the current electric quantity (state of charge, SOC) of the power battery is compared with the predetermined upper electric quantity threshold $SOC_{up}$ such as 30% to determine whether $SOC_{up} \leq SOC$, if yes, execute step S304 and if no, execute step S305.

At step S303, the current speed of the hybrid electrical vehicle is compared with the maximum speed threshold $V^*_{max}$ (i.e., a highest speed which allows the hybrid electric vehicle to switch to the EV mode from the HEV mode, such as 150 km/h) to determine whether $v \leq V_{max}$, if yes, execute step 304 and if no, execute step S305.

At step S304, the hybrid electrical vehicle is controlled to switch to the EV-eco mode.

In other words, when the hybrid electrical vehicle is in the hybrid electrical-economical mode and the control module receives the mode switching instruction to switch to the electrical-economical mode, the control module controls the hybrid electrical vehicle to switch to the electrical-economical mode if the current electric quantity of the power battery is greater than or equal to the first electric quantity threshold such as 30%, or the current speed of the hybrid electrical vehicle is less than or equal to the third speed threshold such as 150 km/h.

At step S305, the hybrid electrical vehicle keeps driving in the HEV-eco mode.

At step S306, switching information about the Sport mode selecting button is obtained, and it is determined whether a manual switching to the sport mode is performed, if yes, execute step S307 and if no, execute step S308.

At step S307, the hybrid electrical vehicle is controlled to switch to the HEV-s mode and a corresponding control strategy of the power system is performed.

At step S308, the running mode is not switched, and then slope information is obtained, i.e., the slope i is detected.

At step S309, it is determined whether $i \leq i_{down}$, if yes, execute step S310, and if no, execute step S317.

At step S310, the current electric quantity (state of charge, SOC) of the power battery and the maximum allowable discharge power Pb of the power battery are detected and are compared with the thresholds (i.e., the upper electric quantity threshold $SOC_{up}$ (such as 30%), the lower electric quantity threshold $SOC_{down}$ (such as 20%), the upper threshold of the maximum allowable discharge power $Pb_{up}$ (such as 30 KW) and the lower threshold of the maximum allowable discharge power $Pb_{down}$ (such as 12 KW)) respectively.

At step S311, it is determined whether $SOC_{up} \leq SOC$ and whether $Pb_{up} \leq Pb$, if yes, execute step S312, if no, execute step S313.

At step S312, the hybrid electrical vehicle is controlled in the economical manner.

In other words, when the hybrid electrical vehicle is in the hybrid electrical-economical mode, the control module 40 controls the hybrid electrical vehicle to operate in the economical manner if the slope detected by the hybrid electrical vehicle is less than or equal to the minimum slope such as 5%, and the current electric quantity of the power battery is greater than or equal to the first electric quantity threshold such as 30% and the maximum allowable discharge power of the power battery is greater than or equal to the first power threshold such as 30 KW.

At step S313, it is determined whether $SOC_{up} > SOC > SOC_{down}$ and $Pb_{up} \leq Pb$, or whether $SOC_{up} \leq SOC$ and $Pb_{up} > Pb > Pb_{down}$, if yes, execute step S314, if no, execute step S315.

At step S314, the hybrid electrical vehicle is controlled in the original manner, i.e., if the original manner is the economical manner, the hybrid electrical vehicle still operates in the economical manner. If the original manner is the low power manner, the hybrid electrical vehicle still operates in the low power manner.

At step S315, it is determined whether $SOC \leq SOC_{down}$ or whether $Pb \leq Pb_{down}$, execute step S316.

At step S316, the hybrid electrical vehicle is controlled in the low power manner.

In other words, when the hybrid electrical vehicle is in the hybrid electrical-economical mode, the control module 40 controls the hybrid electrical vehicle to operate in the economical manner if the slope detected by the hybrid electrical vehicle is less than or equal to the minimum slope such as 5% and the current electric quantity of the power battery is less than or equal to the second electric quantity threshold such as 20%, or if the current slope detected by the hybrid electrical vehicle is less than or equal to the minimum slope such as 5% and the maximum allowable discharge power of the power battery is less than or equal to the second power threshold such as 12 KW, in which the first electric quantity threshold is greater than the second electric quantity threshold, and the first power threshold is greater than the second power threshold.

At step S317, it is determined whether $i_{up} > i > i_{down}$, and if yes, execute step S318, if no, execute step S319.

At step S318, the hybrid electrical vehicle is controlled in the original manner i.e. the economical manner or the lower power manner.

At step S319, it is determined that $i_{up} \leq i$, and execute step S320.

At step 320, the hybrid electrical vehicle is controlled to operate in the economical manner, moreover, the pure electric driving mode at a low speed, the upper limit of the engine, and the upper limit of the electric motor are cancelled.

It should be noted that, in embodiments of the present disclosure, in the low power manner, the engine drives the electric motor to generate power quickly so as to get out of a low power state, such that the electric motor again has the ability of adjusting the working region of the engine, thus ensuring the economy of the hybrid electrical vehicle.

In the embodiment of the present disclosure as shown in FIG. 6, a control method for the hybrid electrical vehicle in the economical manner includes following steps.

At step S401, the current speed of the hybrid electrical vehicle is obtained and the current speed v of the hybrid electrical vehicle is compared with the second speed threshold such as 15 km/h and the third speed threshold such as 30 km/h.

At step S402, it is determined whether $v_{up} \leq v$, and if yes, execute step S403, if no, execute step S415.

At step S403, it is determined whether the torque requirement of the hybrid electrical vehicle exceeds the predetermined torque upper limit curve of the engine as shown in FIG. 7, and if yes, execute step S404, if no, execute step S407.

At step S404, it is determined whether a fault occurs in the power system of the hybrid electrical vehicle, if yes, execute step S406, and if no, execute step S405.

At step S405, the engine is controlled to output a torque with the predetermined torque upper limit curve and the electric motor is controlled to complement the torque. In other words, when the hybrid electrical vehicle operates in the economical manner and the current speed of the hybrid electrical vehicle is greater than or equal to the second speed threshold such as 30 km/h, the control module controls the engine to output a torque with the predetermined torque upper limit curve and controls the electric motor to complement the torque if a torque requirement of the hybrid electrical vehicle exceeds the predetermined torque upper limit curve of the engine.

At step S406, the fault is processed.

At step S407, it is determined whether the torque requirement of the hybrid electrical vehicle is below the predetermined torque lower limit curve of the engine as shown in FIG. 7, and if yes, execute step S408, if no, execute step S411.

At step S408, it is determined whether a fault occurs in the power system of the hybrid electrical vehicle, if yes, execute step S410, and if no, execute step S409.

At step S409, the engine is controlled to output a torque with the predetermined torque lower limit curve and the electric motor is controlled to generate power. In other words, when the hybrid electrical vehicle operates in the economical manner and the current speed of the hybrid electrical vehicle is greater than or equal to the second speed threshold such as 30 km/h, the control module controls the engine to output a torque with the predetermined torque lower limit curve and controls the electric motor to generate power if the torque requirement of the hybrid electrical vehicle is below the predetermined torque lower limit curve of the engine.

At step S410, the fault is processed.

At step S411, it is determined that the torque requirement of the hybrid electrical vehicle exceeds the predetermined torque lower limit curve of the engine and is below the predetermined torque upper limit curve of the engine as shown in FIG. 7.

At step S412, it is determined whether a fault occurs in the power system of the hybrid electrical vehicle, if yes, execute step S414, and if no, execute step S413.

At step S413, the engine is controlled preferentially to satisfy the torque requirement of the hybrid electrical vehicle, and also controlled to output another more torque for generating power. In other words, when the hybrid electrical vehicle operating in the economical manner and the current speed of the hybrid electrical vehicle is greater than or equal to the second speed threshold such as 30 km/h, the control module controls the engine to output the torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. A principle of generating power follows the functional relationship between the generation power and SOC of the power battery as shown in FIG. 8, and following two conditions should be satisfied simultaneously: (1) a generating torque converted to the electric motor is not greater than $Tm_{max}$; (2) a total output torque of the engine does not exceed the predetermined torque upper limit curve as shown in FIG. 7. If the torque of the engine calculated from a generation power curve does not satisfy any of the above two conditions, the above two conditions are used as upper limits to constraint the torque of the engine configured to generate power.

At step S414, the fault is processed.

At step S415, it is determined whether $v_{up} > v > v_{down}$, and if yes, execute step S416, if no, execute step S419.

At step S416, it is determined whether a fault occurs in the power system of the hybrid electrical vehicle, if yes, execute step S418; and if no, execute step S417.

At step S417, the hybrid electrical vehicle is controlled to operate in the original manner, i.e., the hybrid electrical vehicle is still driven by the electric motor only, or the electric motor still assists the engine to drive the hybrid electrical vehicle.

At step S418, the fault is processed.

At step S419, it is determined that $v \leq V_{down}$, and execute step S420.

At step S420, it is determined whether a fault occurs in the power system, if yes, execute step S422 and if no, execute step S421.

At step S421, the hybrid electrical vehicle is driven by the electric motor only and the engine is stalled. In other words, when the hybrid electrical vehicle operates in the economical manner and the speed of the hybrid electrical vehicle is less than or equal to the first speed threshold such as 15 km/h, the control module controls the engine of the engine power subsystem to stop and controls the electric motor of the motor power subsystem still to operate, at this time, the hybrid electrical vehicle operates in the hybrid electrical-economical mode.

At step S422, the fault is processed.

In the embodiment of the present disclosure as shown in FIG. 9, a control method for the hybrid electrical vehicle in the low power manner includes following steps.

At step S501, gear information is obtained.

At step S502, it is determined whether the hybrid electrical vehicle is in a non-P gear, and execute step S503, if no, execute step S515.

At step S03, it is determined whether the torque requirement of the hybrid electrical vehicle exceeds the predetermined torque upper limit curve of the engine as shown in FIG. 7, and if yes, execute step S504, if no, execute step S507.

At step S504, it is determined whether a fault occurs in the power system of the hybrid electrical vehicle, if yes, execute step S506; and if no, execute step S505.

At step S505, the engine is controlled to output a torque with the predetermined torque upper limit curve and the electric motor is controlled to complement the torque. In other words, when the hybrid electrical vehicle operates in the low power manner and is in a non-P gear, the control module 40 controls the engine to output a torque with the predetermined torque upper limit curve and controls the electric motor to complement the torque if a torque requirement of the hybrid electrical vehicle exceeds the predetermined torque upper limit curve of the engine.

At step S506, the fault is processed.

At step S507, it is determined whether he torque requirement of the hybrid electrical vehicle is below the predetermined torque lower limit curve of the engine as shown in FIG. 7, and if yes, execute step S508, if no, execute step S511.

At step S508, it is determined whether a fault occurs in the power system of the hybrid electrical vehicle, if yes, execute step S510; and if no, execute step S509.

At step S509, the engine is controlled to output a torque with the predetermined torque lower limit curve and the electric motor is controlled to generate power. In other words, when the hybrid electrical vehicle operates in the low power manner and is in the non-P gear the control module 40 controls the engine to output a torque with the predetermined torque lower limit curve and controls the electric motor to generate power if the torque requirement of the hybrid electrical vehicle is below the predetermined torque lower limit curve of the engine.

At step S510, the fault is processed.

At step S511, it is determined that the torque requirement of the hybrid electrical vehicle exceeds the predetermined torque lower limit curve of the engine and is below the predetermined torque upper limit curve of the engine, and execute step S512.

At step S512, it is determined whether a fault occurs in the power system, if yes, execute step S514; and if no, execute step S513.

At step S513, the engine is controlled preferentially to satisfy the torque requirement of the hybrid electrical vehicle and is also controlled to output more torque for generating power. In other words, when the hybrid electrical vehicle operates in the low power manner and is in the non-P gear, the control module controls the engine to output the torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. The principle of generating power follows the functional relationship between the generation power and SOC of the power battery as shown in FIG. 8, and following two conditions should be satisfied simultaneously: (1) the generating torque converted to the electric motor is not greater than $Tm_{max}$; (2) the total output torque of the engine does not exceed the predetermined torque upper limit curve as shown in FIG. 7. If the torque of the engine calculated from the generation power curve does not satisfy any of the above two conditions, the above two conditions are used as upper limits to constraint the torque of the engine configured to generate power.

At step S514, the fault is processed.

At step S515, it is determined that the hybrid electrical vehicle is in the P gear, and execute step S516.

At step S516, an idle stop-start strategy is performed. In other words, when the hybrid electrical vehicle operates in the low power manner and is in the P gear, the control module 40 controls the hybrid electrical vehicle to enter an idle stop-start mode, and the engine is stalled.

When the hybrid electrical vehicle is driven in the HEV-eco mode, the electric motor cooperates with the engine to improve the energy utilization factor and general procedures are shown as follows. When the hybrid electrical vehicle operates in the non-economical regions of the engine, the electric motor is used more often than the engine; when the hybrid electrical vehicle operates in the economical regions of the engine, the engine can generate some power to charge the power battery, and the less the electric quantity of the power battery is, the higher the generation power of the engine is. Moreover, in this mode, the maximum output power of the electric motor is limited so as to avoid a long term high power consumption, such that the electric quantity of the power battery is kept in a relatively high level and the electric motor always has electric energy to adjust the engine to operate in high efficiency regions, thus reducing the oil wear during the hybrid electrical driving as much as possible and ensuring the economy and emission behavior of the hybrid electrical vehicle. When the hybrid electrical vehicle requires heavy load output, the electric motor can assist the engine to drive the vehicle together, and thus the power performance is greatly improved as compared with that in the EV mode. When the user needs long distance driving and wants to reduce the oil wear as much as possible, he can choose the above mode.

In an embodiment of the present disclosure as shown in FIG. 10, a control method for the hybrid electrical vehicle in the hybrid electrical-sport mode includes following steps.

At step S601, switching information about the EV mode selecting button is obtained and it is determined whether a manual switch to the EV mode is performed, if yes, execute step S602; and if no, execute step S606.

At step S602, the current electric quantity SOC of the power battery is compared with the second electric quantity threshold such as 30% and it is determined whether $SOC_{up}$≤SOC, if yes, execute step S603, if no, execute step S605.

At step S603, the current speed of the hybrid electrical vehicle is compared with the first speed threshold $V_{max}$ (i.e., the highest speed that allows the hybrid electric vehicle to switch to the EV mode from the HEV mode, such as 150 km/h), and it is determined whether $v≤V_{max}$, if yes, execute step 604; and if no, execute step S605.

At step S604, the hybrid electrical vehicle is controlled to switch to the EV-s mode and a corresponding control strategy of the power system is performed.

In other words, when the hybrid electrical vehicle is in the hybrid electrical-sport mode and the mode switching instruction to switch to the electrical-sport mode is received, the control module controls the hybrid electrical vehicle to switch to the electrical-sport mode if the current electric quantity of the power battery is greater than or equal to the first electric quantity threshold such as 30%, or the current speed of the hybrid electrical vehicle is less than or equal to the third speed threshold such as 150 km/h.

At step S605, the hybrid electrical vehicle keeps driving in the HEV-s mode.

At step S606, the switching information about the economical mode selecting button is obtained and it is determined whether a manual switch to the economical mode is performed, if yes, execute step S607; and if no, execute step S608.

At step S607, the hybrid electrical vehicle is controlled to switch to the HEV-eco mode and a corresponding control strategy of the power system is performed.

At step S608, the running mode is not switched, and the gear information is obtained to determine the current gear of the hybrid electrical vehicle.

At step S609, it is determined whether the hybrid electrical vehicle is in the P gear, and if yes, execute step S610, and if no, execute step S611.

At step S610, the idle stop-start strategy is performed. In other words, when the hybrid electrical vehicle operates in the hybrid electrical-sport mode and is in the P gear, the control module 40 controls the hybrid electrical vehicle to enter the idle stop-start mode.

At step S611, it is determined that the hybrid electrical vehicle is in the non-P gear, and if yes, execute step S612.

At step S612, the torque requirement of the hybrid electrical vehicle is compared with a predetermined peak torque of the engine and it is determined whether the torque requirement of the hybrid electrical vehicle exceeds the predetermined peak torque, if yes, execute step S613; and if no, execute step S614.

At step S613, the engine is controlled to output the predetermined peak torque and the electric motor is controlled to complement the torque. When the electric motor is limited by its current capability or the capability of the power battery, it drives with the maximum capabilities of itself and the power battery. In other words, when the hybrid electrical vehicle is in the hybrid electrical-sport mode and is in the non-P gear, the control module 40 controls the engine to output the predetermined peak torque of the engine and controls the electric motor to complement the torque if the torque requirement of the hybrid electrical vehicle exceeds the predetermined peak torque of the engine.

At step S614, the engine is controlled preferentially to satisfy the torque requirement of the hybrid electrical vehicle and is also controlled to output another more torque for generating power. In other words, when the hybrid electrical vehicle is in the hybrid electrical-sport mode and is in the non-P gear, the control module 40 controls the engine to output a torque satisfying the torque requirement of the hybrid electrical vehicle and controls the electric motor to generate power if the torque requirement of the hybrid electrical vehicle is less than or equal to the predetermined peak torque of the engine. The principle of generating power follows the relationship between the generation power and SOC of the power battery as shown in FIG. 8, and following two conditions should be satisfied simultaneously: (1) the generating torque converted to the electric motor is not greater than $Tm_{max}$; (2) the total output torque of the engine does not exceed the predetermined torque upper limit curve as shown in FIG. 7. If the torque of the engine calculated from the generation power curve does not satisfy any of the above two conditions. The above two conditions are used as upper limits to constraint the torque of the engine configured to generate power.

When the hybrid electrical vehicle is driven in the HEV-s mode and is in the non-P gear, the engine is kept in a starting state. Only if the hybrid electrical vehicle is in the P gear and the idle stop-start conditions are satisfied can the engine be stalled. In the HEV-s mode, the maximum output torque and the maximum output power of the engine and the electric motor are not limited any more, thus a maximum driving capability of the power system can be achieved. Thus, the HEV-s mode realizes the best power performance among the four running modes. However, since the engine keeps operating during the driving process of the hybrid electrical vehicle (either cooperating with the electric motor to drive the vehicle or driving the vehicle and driving the electric motor to generate power synchronously (when the electric quantity of the power battery is less than a certain threshold), the oil wear is relatively high and the economy of the hybrid electrical vehicle cannot be ensured. The HEV-s mode is suitable for users who have a high requirement for power performance and has enough power equal to that of the fuel vehicle with a high emission.

In embodiments of the present disclosure, by providing the EV, HEV, economical and Sport mode selecting buttons, four different running modes (i.e., the EV-eco mode, the EV-s mode, the HEV-eco mode and the HEV-s mode) can be obtained, each of which has different power performance requirement and economy requirement and thus has different driving strategies. Moreover, the power system of the hybrid electrical vehicle adopts the parallel connection mode instead of the series connection mode or the series-parallel connection mode. In addition, in the driving strategies, a starting point of the engine is optimized, a speed threshold is increased, the slope detection is added and a determination about the demanded power is cancelled. In the economical manner of the HEV-eco mode, the engine is limited to operate in the region between the predetermined torque upper limit curve and the predetermined torque lower limit curve, and the generation power is represented by a dynamic curve taking the SOC value of the power battery as its independent variable.

With the method according to embodiments of the present disclosure, by providing a plurality of running modes a driving requirement of the user in different operating conditions can be satisfied, i.e., not only pure electric consumption in a city operating condition can be satisfied, but also power performance requirement in a suburban district working condition can be satisfied, thus the hybrid electrical vehicle can be driven according to subjective operation intentions of the user and the driving fun is improved. The power system of the hybrid electrical vehicle adopts the parallel connection mode which can effectively improve the energy utilization factor as compared with the series connection mode. Moreover, the parallel connection is simple in structure and can avoid a complex ECVT match in the series-parallel connection, which reduces a risk of driving uncomfortably caused by the match failure. Furthermore, in the driving strategy, the starting point of the engine is optimized to avoid premature and frequent start of the engine, such that noise when the engine starts can be reduced effectively, a working life of a starting system can be improved and a risk of pulling down a low voltage frequently caused by frequent start can also be reduced, thus other low voltage electrical equipments can be ensured to operate normally. The working region of the engine is also optimized so as to ensure that the engine keeps operating in the high efficiency region, and the generation power is also optimized so as to ensure that there are high power equilibrium points during the driving of the vehicle, thus facilitating the hybrid electrical vehicle mostly being in the economical strategy and reducing the oil wear efficiently. Moreover, the control method for the hybrid electrical vehicle can ensure the running power performance of the pure electric vehicle and the driving range, avoid the high-power electricity of the vehicle for a long time when meeting the power requirement of the whole vehicle so as to improve the electric efficiency, at the same time, avoiding the frequent start-stop phenomenon of the engine, thus increasing the starter life, reducing the traffic noise, and improve the driving comfort.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control system for a hybrid electrical vehicle, comprising:
    a transmission device connected with wheels of the hybrid electrical vehicle;
    an engine power subsystem connected with the transmission device;
    a motor power subsystem connected with the transmission device; and
    a control module configured to control the hybrid electrical vehicle to operate in a hybrid electrical-economical mode by controlling the engine power subsystem and the motor power subsystem and to control the hybrid electrical vehicle to operate in a first manner based on:
        a current slope detected by the hybrid electrical vehicle being less than or equal to a minimum slope,
        a current electric quantity of a power battery of the motor power subsystem being greater than or equal to a first electric quantity threshold, and
        a maximum allowable discharge power of the power battery being greater than or equal to a first power threshold,
    wherein based on the hybrid electrical vehicle operating in the first manner and a speed of the hybrid electrical vehicle being greater than or equal to a second speed threshold, the control module is configured to:
    control an engine of the engine power subsystem to output a first torque with a predetermined torque upper limit curve, and control an electric motor of the motor power subsystem to complement the first torque based on a torque requirement of the hybrid electrical vehicle exceeding the predetermined torque upper limit curve of the engine;
    control the engine to output a second torque with a predetermined torque lower limit curve, and control the electric motor to generate power based on the torque requirement of the hybrid electrical vehicle being below the predetermined torque lower limit curve of the engine; and
    control the engine to output a third torque satisfying the torque requirement of the hybrid electrical vehicle and control the electric motor to generate power based on the torque requirement of the hybrid electrical vehicle exceeding the predetermined torque lower limit curve of the engine and being below the predetermined torque upper limit curve of the engine.

2. The control system of the hybrid electrical vehicle according to claim 1, wherein the control module is configured control the hybrid electrical vehicle to operate in a second manner based on:
    the slope detected by the hybrid electrical vehicle being less than or equal to the minimum slope and the current electric quantity of the power battery being less than or equal to a second electric quantity threshold, or
    the current slope detected by the hybrid electrical vehicle being less than or equal to the minimum slope and the maximum allowable discharge power of the power battery being less than or equal to a second power threshold,
wherein the first electric quantity threshold is greater than the second electric quantity threshold and the first power threshold is greater than the second power threshold.

3. The control system of the hybrid electrical vehicle according to claim 1, wherein the control module is configured to control an engine of the engine power subsystem to stop and to control an electric motor of the motor power subsystem to operate based on the hybrid electrical vehicle operating in the first manner and a speed of the hybrid electrical vehicle being less than or equal to a first speed threshold.

4. The control system of the hybrid electrical vehicle according to claim 2, wherein based on the hybrid electrical vehicle operating in the second manner and being in a non-P gear, the control module is configured to:
control an engine to output a first torque with a predetermined torque upper limit curve and control an electric motor of the motor power subsystem to complement the first torque based on a torque requirement of the hybrid electrical vehicle exceeding the predetermined torque upper limit curve of the engine;
control the engine to output a second torque with a predetermined torque lower limit curve and control the electric motor to generate power based on the torque requirement of the hybrid electrical vehicle being below the predetermined torque lower limit curve of the engine; and
control the engine to output a third torque satisfying the torque requirement of the hybrid electrical vehicle and control the electric motor to generate power based on the torque requirement of the hybrid electrical vehicle exceeding the predetermined torque lower limit curve of the engine and being below the predetermined torque upper limit curve of the engine.

5. The control system of the hybrid electrical vehicle according to claim 2, wherein based on the hybrid electrical vehicle operating in the second manner and being in a P gear, the control module is configured to control the hybrid electrical vehicle to enter an idle stop-start mode.

6. A control method for a hybrid electrical vehicle, comprising:
controlling the hybrid electrical vehicle to operate in a hybrid electrical-economical mode by controlling an engine power subsystem and a motor power subsystem;
detecting a current electric quantity of a power battery of the motor power subsystem, a maximum allowable discharge power of the power battery, and a current slope of the hybrid electrical vehicle; and
controlling the hybrid electrical vehicle to operate in a first manner based on determining that the current slope detected by the hybrid electrical vehicle is less than or equal to a minimum slope, the current electric quantity of the power battery is greater than or equal to a first electric quantity threshold, and the maximum allowable discharge power of the power battery is greater than or equal to a first power threshold,
wherein based on determining that the hybrid electrical vehicle operates in the first manner and a speed of the hybrid electrical vehicle is greater than or equal to a second speed threshold, the control method further comprising:
controlling an engine to output a first torque with a predetermined torque upper limit curve and controlling an electric motor to complement the torque based on determining that a torque requirement of the hybrid electrical vehicle exceeds the predetermined torque upper limit curve of the engine;
controlling the engine to output a second torque with a predetermined torque lower limit curve and controlling the electric motor to generate power based on determining that the torque requirement of the hybrid electrical vehicle is below the predetermined torque lower limit curve of the engine; and
controlling the engine to output a third torque satisfying the torque requirement of the hybrid electrical vehicle and controlling the electric motor to generate power based on determining that the torque requirement of the hybrid electrical vehicle exceeds the predetermined torque lower limit curve of the engine and is below the predetermined torque upper limit curve of the engine.

7. The control method for the hybrid electrical vehicle according to claim 6, further comprising: controlling the hybrid electrical vehicle to operate in a second manner based on determining that:
the slope detected by the hybrid electrical vehicle is less than or equal to the minimum slope and the current electric quantity of the power battery is less than or equal to a second electric quantity threshold, or
the current slope detected by the hybrid electrical vehicle is less than or equal to the minimum slope and the maximum allowable discharge power of the power battery is less than or equal to a second power threshold,
wherein the second electric quantity threshold is greater than the first electric quantity threshold, and the first power threshold is greater than the second power threshold.

8. The control method for the hybrid electrical vehicle according to claim 6, further comprising:
controlling an engine of the engine power subsystem to stop and controlling an electric motor of the motor power subsystem to operate based on determining that the hybrid electrical vehicle operates in the first manner and a speed of the hybrid electrical vehicle is less than or equal to a first speed threshold.

9. The control method for the hybrid electrical vehicle according to claim 7, wherein based on determining that the hybrid electrical vehicle operates in the second manner and is in a non-P gear, the control method further comprising:
controlling an engine to output a first torque with a predetermined torque upper limit curve and controlling the electric motor to complement the first torque based on determining that a torque requirement of the hybrid electrical vehicle exceeds the predetermined torque upper limit curve of the engine;
controlling the engine to output a second torque with a predetermined torque lower limit curve and controlling the electric motor to generate power based on determining that the torque requirement of the hybrid electrical vehicle is below the predetermined torque lower limit curve of the engine; or
controlling the engine to output a third torque satisfying the torque requirement of the hybrid electrical vehicle and controlling the electric motor to generate power based on determining that the torque requirement of the hybrid electrical vehicle exceeds the predetermined torque lower limit curve of the engine and is below the predetermined torque upper limit curve of the engine.

10. The control method for the hybrid electrical vehicle according to claim 7, further comprising controlling the hybrid electrical vehicle to enter an idle stop-start mode based on determining that the hybrid electrical vehicle operates in the second manner and is in a P gear.

* * * * *